US009762859B2

(12) United States Patent
Hasegawa et al.

(10) Patent No.: US 9,762,859 B2
(45) Date of Patent: Sep. 12, 2017

(54) SHARED COMMUNICATION TERMINAL, COMMUNICATION SYSTEM, AND COMMUNICATION METHOD

(71) Applicants: Takashi Hasegawa, Kanagawa (JP); Takeshi Homma, Kanagawa (JP)

(72) Inventors: Takashi Hasegawa, Kanagawa (JP); Takeshi Homma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/376,957

(22) Filed: Dec. 13, 2016

(65) Prior Publication Data
US 2017/0187990 A1    Jun. 29, 2017

(30) Foreign Application Priority Data
Dec. 25, 2015    (JP) ................................. 2015-254664

(51) Int. Cl.
*H04N 7/15*    (2006.01)
*H04L 29/06*    (2006.01)
*H04N 5/232*    (2006.01)

(52) U.S. Cl.
CPC ........... *H04N 7/15* (2013.01); *H04L 65/1069* (2013.01); *H04L 65/1093* (2013.01); *H04L 65/604* (2013.01); *H04N 5/23293* (2013.01)

(58) Field of Classification Search
CPC combination set(s) only.
See application file for complete search history.

(56) References Cited

U.S. PATENT DOCUMENTS

2008/0052514 A1*  2/2008  Nakae ................. G06F 21/6218
                                                      713/168
2013/0325970 A1* 12/2013  Roberts .............. H04N 21/4788
                                                      709/206
(Continued)

FOREIGN PATENT DOCUMENTS

EP          2 739 112 A1    6/2014
JP          2012-178135     9/2012

OTHER PUBLICATIONS

U.S. Appl. No. 15/187,240, filed Jun. 20, 2016.
(Continued)

*Primary Examiner* — Joseph J Nguyen
(74) *Attorney, Agent, or Firm* — Oblon, McClelland, Maier & Neustadt, L.L.P.

(57) ABSTRACT

A shared communication terminal, a communication system, and a method of communication. The shared communication terminal and the method of communication includes receiving, from a first personal communication terminal personalized to a user who participates in a streaming communication at a first site, first personal communication terminal identification information for identifying the first personal communication terminal, receiving an instruction to start communication instructing a shared communication terminal, which serves as a local communication terminal at the first site, to request to start streaming communication with a counterpart shared communication terminal at a second site to exchange contents of data, transmitting the first personal communication terminal identification information to a communication management system, and transmitting communication start request indicating a request that the local communication terminal requests to start streaming communication with the counterpart shared communication terminal. The communication system includes the shared com- (Continued)

munication terminal and the counterpart shared communication terminal.

12 Claims, 29 Drawing Sheets

(56) References Cited

U.S. PATENT DOCUMENTS

| | | | |
|---|---|---|---|
| 2014/0368601 A1* | 12/2014 | deCharms | H04W 4/021 348/14.02 |
| 2015/0032809 A1 | 1/2015 | Xie et al. | |
| 2016/0099893 A1 | 4/2016 | Hasegawa et al. | |
| 2016/0112465 A1 | 4/2016 | Hasegawa et al. | |
| 2016/0269327 A1 | 9/2016 | Hasegawa et al. | |

OTHER PUBLICATIONS

U.S. Appl. No. 15/213,707, filed Jul. 19, 2016.
U.S. Appl. No. 15/218,427, filed Jul. 25, 2016, Takeshi Homma, et al.
Extended European Search Report, dated May 16, 2017 issued in European Application No. 16201242.2-1853, 9 pages.

* cited by examiner

FIG. 9

AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG. 10

TERMINAL MANAGEMENT TABLE

| TERMINAL ID | CONTACT NAME | OPERATING STATUS | RECEIVED DATE AND TIME | IP ADDRESS OF TERMINAL |
|---|---|---|---|---|
| 01aa | AA TERMINAL, TOKYO OFFICE, JAPAN | ONLINE (COMMUNICATING) | 2015.4.10.13:40 | 1.2.1.3 |
| 01ab | AB, TOKYO OFFICE, JAPAN | ONLINE (COMMUNICATING) | 2015.4.09.12:00 | 1.2.1.4 |
| 01ac | AC, TOKYO OFFICE, JAPAN | ONLINE (COMMUNICATING) | 2015.4.09.12:30 | 1.2.1.5 |
| ... | ... | ... | ... | ... |
| 01ba | BA TERMINAL, BEIJING OFFICE, CHINA | ONLINE | 2015.4.10.13:45 | 1.2.2.3 |
| 01bb | BB, BEIJING OFFICE, CHINA | ONLINE (TEMPORARILY SUSPENDED) | 2015.4.10.13:50 | 1.2.2.4 |
| ... | ... | ... | ... | ... |
| 01ca | CA TERMINAL, WASHINGTON D.C. OFFICE, U.S. | ONLINE (COMMUNICATING) | 2015.4.10.12:46 | 1.3.1.3 |
| 01cb | CB, WASHINGTON D.C. OFFICE, U.S. | ONLINE (COMMUNICATING) | 2015.4.10.12:46 | 1.3.1.4 |
| 01cc | CC, WASHINGTON D.C. OFFICE, U.S. | ONLINE (COMMUNICATING) | 2015.4.10.12:55 | 1.3.1.5 |
| ... | ... | ... | ... | ... |
| 01da | DA TERMINAL, BERLIN OFFICE, EUROPE | ONLINE (COMMUNICATING) | 2015.4.08.12:45 | 1.3.2.3 |
| 07db | DB, BERLIN OFFICE, EUROPE | ONLINE | 2015.4.10.12:45 | 1.3.2.4 |
| ... | ... | ... | ... | ... |

FIG. 11

CONTACT LIST MANAGEMENT TABLE

| STARTING TERMINAL ID | COUNTERPART TERMINAL ID |
|---|---|
| 01aa | 01ab, ···, 01ba, 01bb, ···, 01ca, 01cb, 01da, 01db, ··· |
| 01ab | 01aa, 01ca, 01cb, 01da |
| ··· | ··· |
| 01ba | 01aa, 01ab, 01ca, 01cb, 01da, 01db |
| ··· | ··· |
| 01ca | 01aa, 01ab, 01ac, 01cb, 01cc, ··· |
| 01cb | 01aa, 01ab, 01ac, 01ca, 01cc, ··· |
| ··· | ··· |
| 01da | 01aa, 01ab, 01ba, ···, 01da, 01ca, 01cb, ···, 01db |

FIG. 12

SESSION MANAGEMENT TABLE

| SESSION ID | RELAY DEVICE ID | STARTING TERMINAL ID | COUNTERPART TERMINAL ID | DELAY TIME | DELAY INFORMATION RECEIVED DATE AND TIME |
|---|---|---|---|---|---|
| se01 | 111a | 01ca | 01aa | 200 | 2015.4.10.13:41 |
| ... | ... | ... | ... | ... | ... |

FIG. 13

COMMUNICATION INFORMATION MANAGEMENT TABLE

| COMMUNICATION ID | TERMINAL ID OF SHARED COMMUNICATION TERMINAL | TERMINAL ID OF PERSONAL COMMUNICATION TERMINAL |
|---|---|---|
| co01 | 01ca | 01cb, 01cc |
|  | 01aa | - |
| ... | ... | ... |

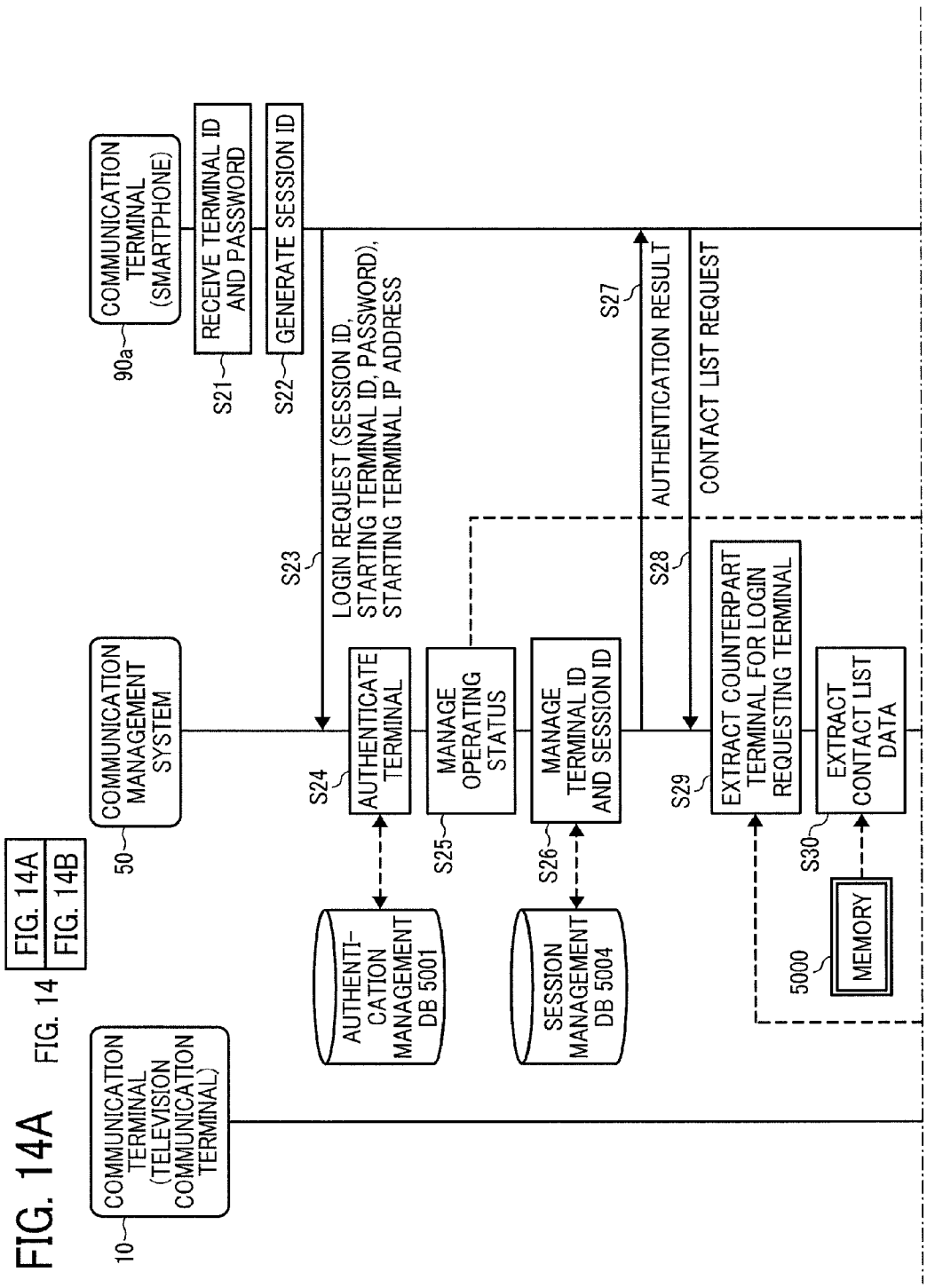

FIG. 15C

| STATUS | TERMINAL ID | CONTACT NAME |
|---|---|---|
| 📞 | 01ab | AB, TOKYO OFFICE, JAPAN |
| ⋮ | ⋮ | ⋮ |
| 📞 | 01ca | CA TERMINAL, WASHINGTON D.C. OFFICE, U.S. |
| 📞 | 01cb | CB, WASHINGTON D.C. OFFICE, U.S. |
| ☏ | 01cc | CC, WASHINGTON D.C. OFFICE, U.S. |

QR CODE ~7110a

7100a

FIG. 17A
FIG. 17B
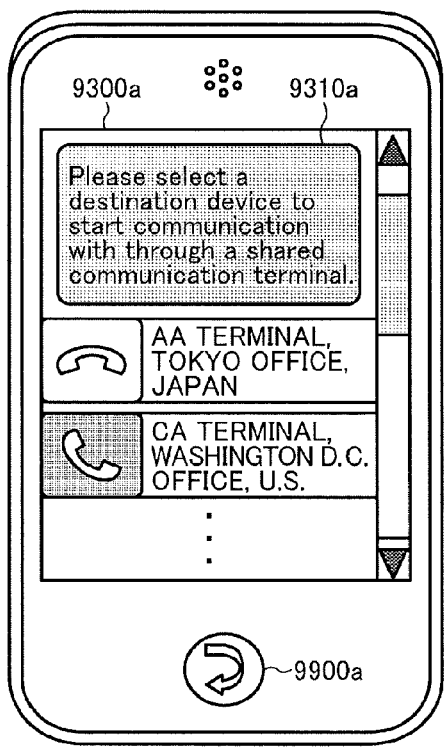
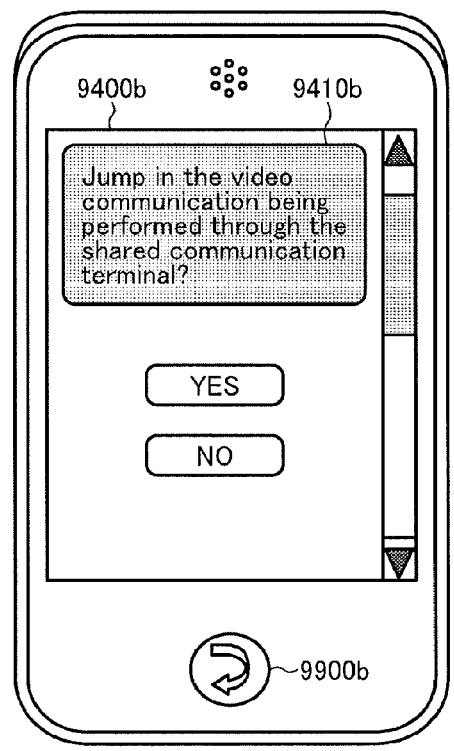

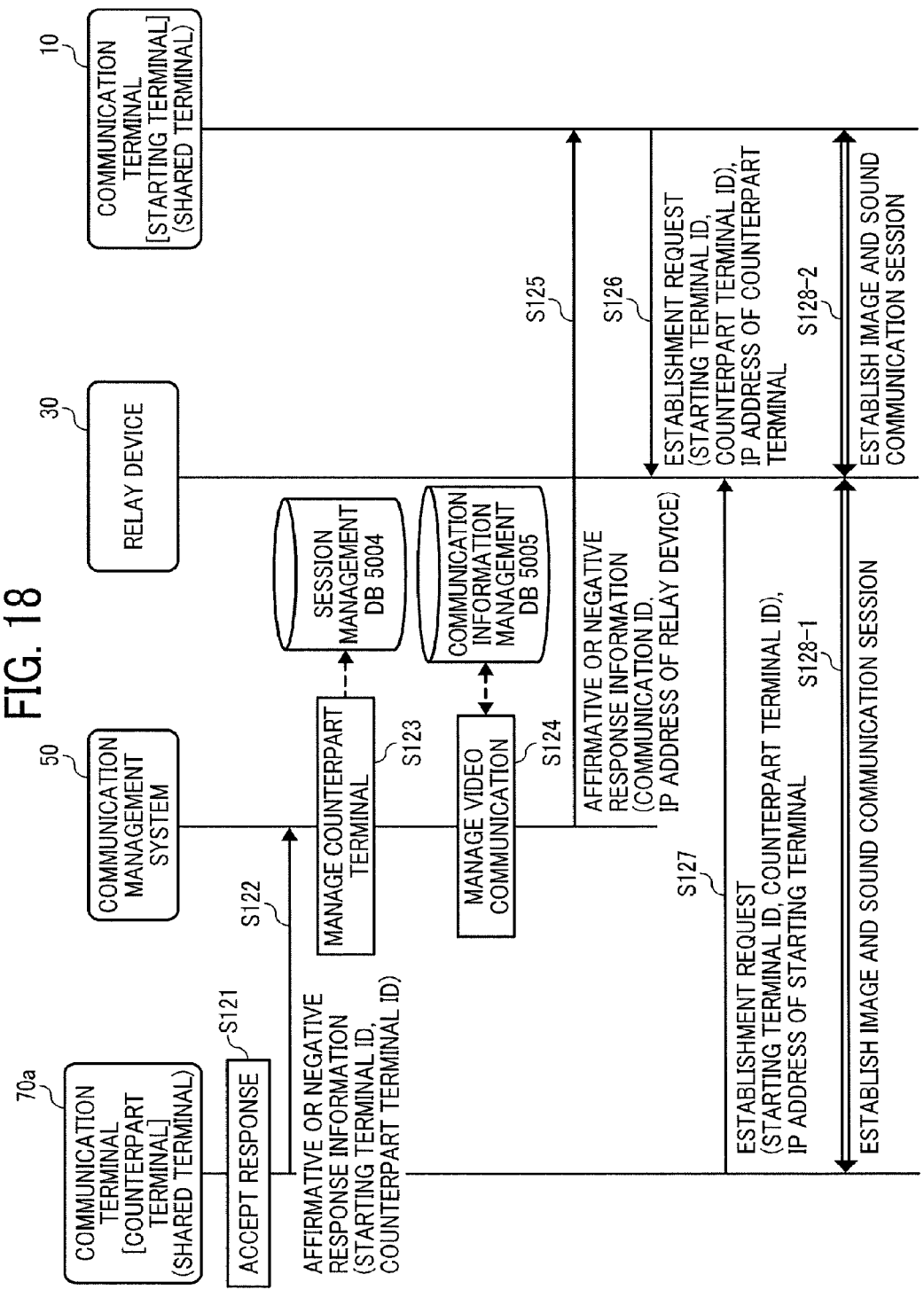

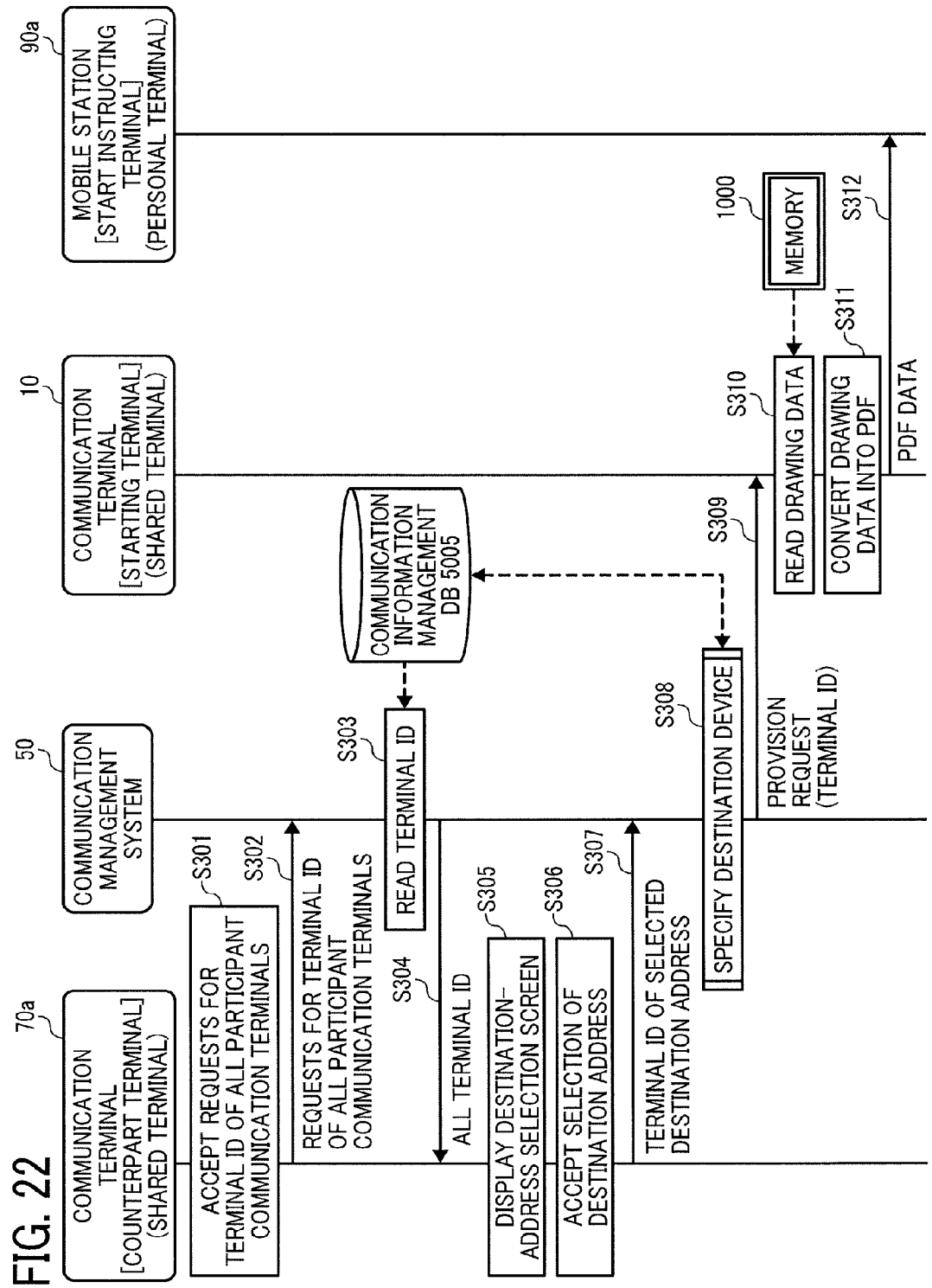

FIG. 27A

| STATUS | TERMINAL ID | CONTACT NAME |
|---|---|---|
| SHARED | 01ca | CA TERMINAL, WASHINGTON D.C. OFFICE, U.S. |
| | 01cb | CB, WASHINGTON D.C. OFFICE, U.S. |
| | 01cc | CC, WASHINGTON D.C. OFFICE, U.S. |

Please select destination devices to which the drawing data is to be distributed.
If the contact name is a terminal, the drawing data will be distributed to all the mobile stations of the people who use that terminal.

FIG. 27B

| | STATUS | TERMINAL ID | CONTACT NAME |
|---|---|---|---|
| ☑ | SHARED | 01ca | CA TERMINAL, WASHINGTON D.C. OFFICE, U.S. |
| ☑ | | 01cb | CB, WASHINGTON D.C. OFFICE, U.S. |
| ☑ | | 01cc | CC, WASHINGTON D.C. OFFICE, U.S. |

Please select destination devices to which the drawing data is to be distributed.
If the contact name is a terminal, the drawing data will be distributed to all the mobile stations of the people who use that terminal.

SHARED COMMUNICATION TERMINAL, COMMUNICATION SYSTEM, AND COMMUNICATION METHOD

CROSS-REFERENCE TO RELATED APPLICATION

This patent application is based on and claims priority pursuant to 35 U.S.C. §119(a) to Japanese Patent Application No. 2015-254664, filed on Dec. 25, 2015, in the Japan Patent Office, the entire disclosure of which is hereby incorporated by reference herein.

BACKGROUND

Technical Field

Embodiments of the present invention relate to a shared communication terminal, a communication system, and a communication method.

Background Art

With the increased need for reducing the cost of business trip and the time spent for the business trip, systems with a plurality of communication terminals for arranging a video conference (teleconference) among a plurality of sites are now widely used. For example, video conference terminals are used as such communication terminals as above, and the video conference terminals directly transmit or receive image data and audio data among the video conference terminals to achieve teleconference or the like.

Moreover, electronic whiteboards are used as a communication terminal in recent years. When such electronic whiteboards are used, an image that is drawn on an electronic whiteboard at one site is displayed on an electronic whiteboard at another site. By so doing, teleconference or the like can be achieved.

Further, mobile stations such as smartphones are used as an example of a communication terminal. Such smartphones are relatively smaller than the video conference terminals, and mobile stations are personal communication terminals that are personalized to users. Thus, smartphones are usually carried by users. Accordingly, a user can easily start teleconference or the like with a counterpart communication terminal by using his/her mobile station. However, the display screen of a mobile station is small, and there are some cases in which it is not easy to sufficiently communicate with each other through the video communication. Due to such circumstances, there are some cases in which, for example, a video conference terminal or an electronic whiteboard is preferred at sites instead of mobile stations.

SUMMARY

Embodiments of the present invention described herein provide a shared communication terminal to be shared by a plurality of users, a communication system, and a method of communication. The shared communication terminal and the method of communication includes receiving, from a first personal communication terminal personalized to a user who participates in a streaming communication at a first site, first personal communication terminal identification information for identifying the first personal communication terminal, receiving an instruction to start communication instructing a shared communication terminal, which serves as a local communication terminal at the first site, to request to start streaming communication with a counterpart shared communication terminal at a second site to exchange contents of data, transmitting the first personal communication terminal identification information to the communication management system, and transmitting communication start request indicating a request that the local communication terminal requests to start streaming communication with the counterpart shared communication terminal. The communication system includes the shared communication terminal and the counterpart shared communication terminal.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 9 is a diagram illustrating an example data structure of an authentication management table, according to an embodiment of the present invention.

FIG. 10 is a diagram illustrating an example data structure of a terminal management table, according to an embodiment of the present invention.

FIG. 11 is a diagram illustrating an example data structure of a contact list management table, according to an embodiment of the present invention.

FIG. 12 is a diagram illustrating a session management table according to an embodiment of the present invention.

FIG. 13 is a diagram illustrating a communication information management table according to an embodiment of the present invention.

FIG. 14A and FIG. 14B are a sequence diagram illustrating the preparation processes for communication, according to an embodiment of the present invention.

FIG. 15C illustrates an example of a contact list displayed on a communication terminal 10, according to an embodiment of the present invention.

FIG. 17A is an example of a contact list page displayed on a start-instructing terminal, according to an embodiment of the present invention.

FIG. 17B is an example of a contact list page displayed on a jump-in participant terminal, according to an embodiment of the present invention.

FIG. 18 is a sequence diagram illustrating the processes of starting streaming communication from a personal communication terminal through a shared communication terminal, according to an embodiment of the present invention.

FIG. 22 is a sequence diagram illustrating the operation of distributing drawing data, according to an embodiment of the present invention.

FIG. 27A and FIG. 27B illustrate an example screen to select a destination device to which drawing data is to be distributed, according to a modification of the embodiment illustrated in FIG. 24.

Figure 1:
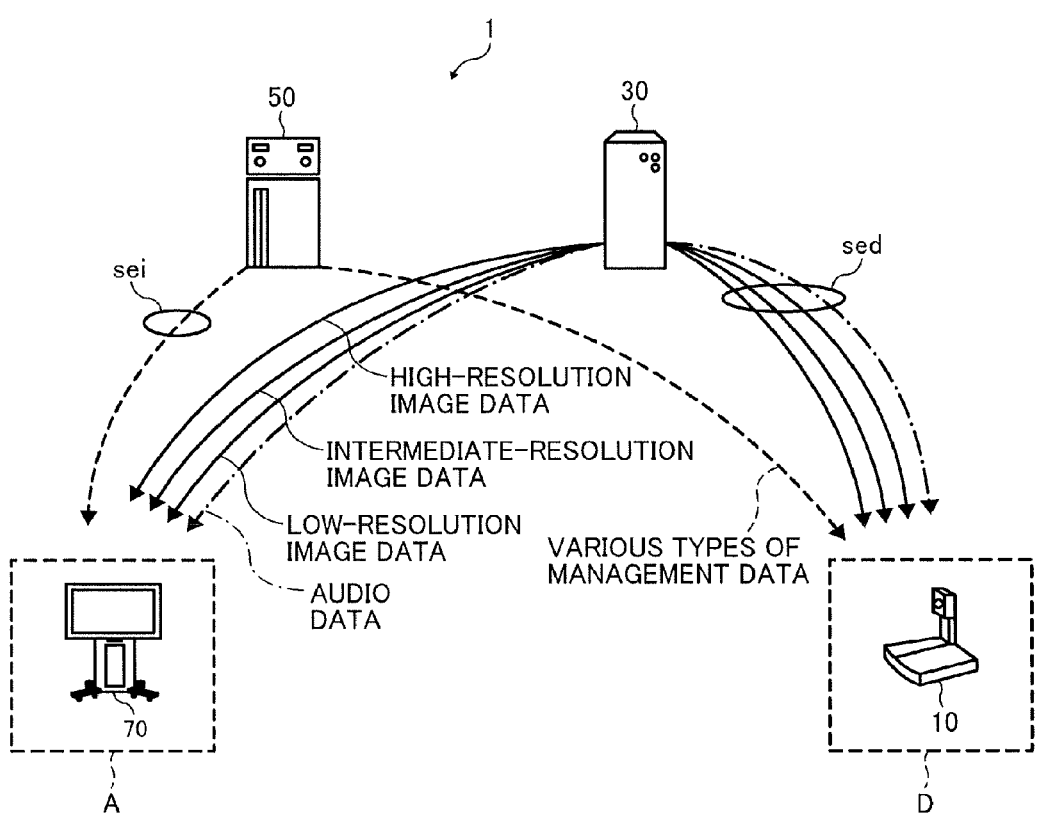
FIG. 1 is a schematic diagram illustrating a part of a communication system relating to video conference communication, according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, an embodiment of the present invention is described with reference to the drawings.

<<Schematic Configuration of Communication System>>

Firstly, a communication system 1 that performs a video conference between a plurality of communication terminals 10 and 70 is described with reference to FIG. 1.

FIG. 1 is a schematic diagram illustrating the communication of the video conference performed by the communication system according to an embodiment of the present invention.

Note that the "video conference" may also be referred to as a "teleconference". Here, the video conference is described by way of example, but such a video conference may just be a simple conversation.

The communication system 1 includes the multiple communication terminals 10 and 70, a relay device 30, and a communication management system 50. The communication terminals 10 and 70 transmit and receive image data and audio data that are an example of the contents of data. In FIG. 1, a video conference terminal is depicted as an example of the communication terminal 10, and an electronic whiteboard is depicted as an example of the communication terminal 70. Note that image data may be a video image or a still image or both of the video image and the still image.

The communication terminal that serves as a requesting terminal that requests the start-up of a video conference is referred to as a "starting communication terminal", and the communication terminal that serves as a destination (relay destination) of the request is referred to as a "counterpart communication terminal". In FIG. 1, the communication terminal 70 and the communication terminal 10 are referred to as a starting communication terminal and a counterpart communication terminal, respectively. However, when the communication terminal 10 requests to start a video conference with the communication terminal 70, the communication terminal 10 serves as a starting communication terminal, and the communication terminal 70 serves as a counterpart communication terminal. Note that the communication terminals 10 and 70 may be used not only for communication between different offices or for communication between different rooms in the same office, but also for communication within the same room or for outdoor-indoor communication or outdoor-outdoor communication.

The relay device 30 relays contents of data among a plurality of communication terminals 10 and 70. The communication management system 50 collectively manages the login authentication of the communication terminals 10 and 70, the communication status of the communication terminals 10 and 70, a contact list, the communication status of the relay device 30, or the like. The relay devices 30 and the communication management system 50 according to the present embodiment may be configured by a single computer or a plurality of computers to which functions are allocated as desired in a divided manner.

In the communication system 1, a management information session sei for sending and receiving various kinds of management information is established between the starting communication terminal and the counterpart communication terminal via the communication management system 50. Moreover, the four sessions of sending and receiving the four kinds of data including high-resolution image data, medium-resolution image data, low-resolution image data, and audio data are established between the starting communication terminal and the counterpart communication terminal via the relay device 30. In FIG. 1, these four sessions are collectively referred to as an image and audio data session sed. The image and audio data session "sed" does not necessarily include four sessions, but may include any number of sessions greater than or less than four. Alternatively, a communication session may directly be established between a starting communication terminal and a counterpart communication terminal without the relay device 30.

Here, the resolution of image data used in the present embodiment is described. The low-resolution image data serves as a base image, and has, for example, horizontal 160 pixels by vertical 120 pixels. The intermediate-resolution image data has, for example, horizontal 320 pixels by vertical 240 pixels. The high-resolution image data has, for example, horizontal 640 pixels by vertical 480 pixels. In the case of a narrow band path, low-quality image data that only includes low-resolution image data serving as a base image is relayed. In the case of a relatively wide band path, low-resolution image data that serves as a base image, and intermediate-quality image data including intermediate-resolution image data are relayed. In the case of a very wide band path, low-resolution image data that serves as a base image, intermediate-resolution image data, and high-resolution image data are relayed. As audio data has a relatively small data size compared with image data, such audio data is relayed even in the case of a narrow band path.

<<Hardware Configuration according to Present Embodiment>>

Next, the hardware configuration according to the present embodiment is described.

<<Hardware Configuration of Video Conference Terminal>>

Figure 2:
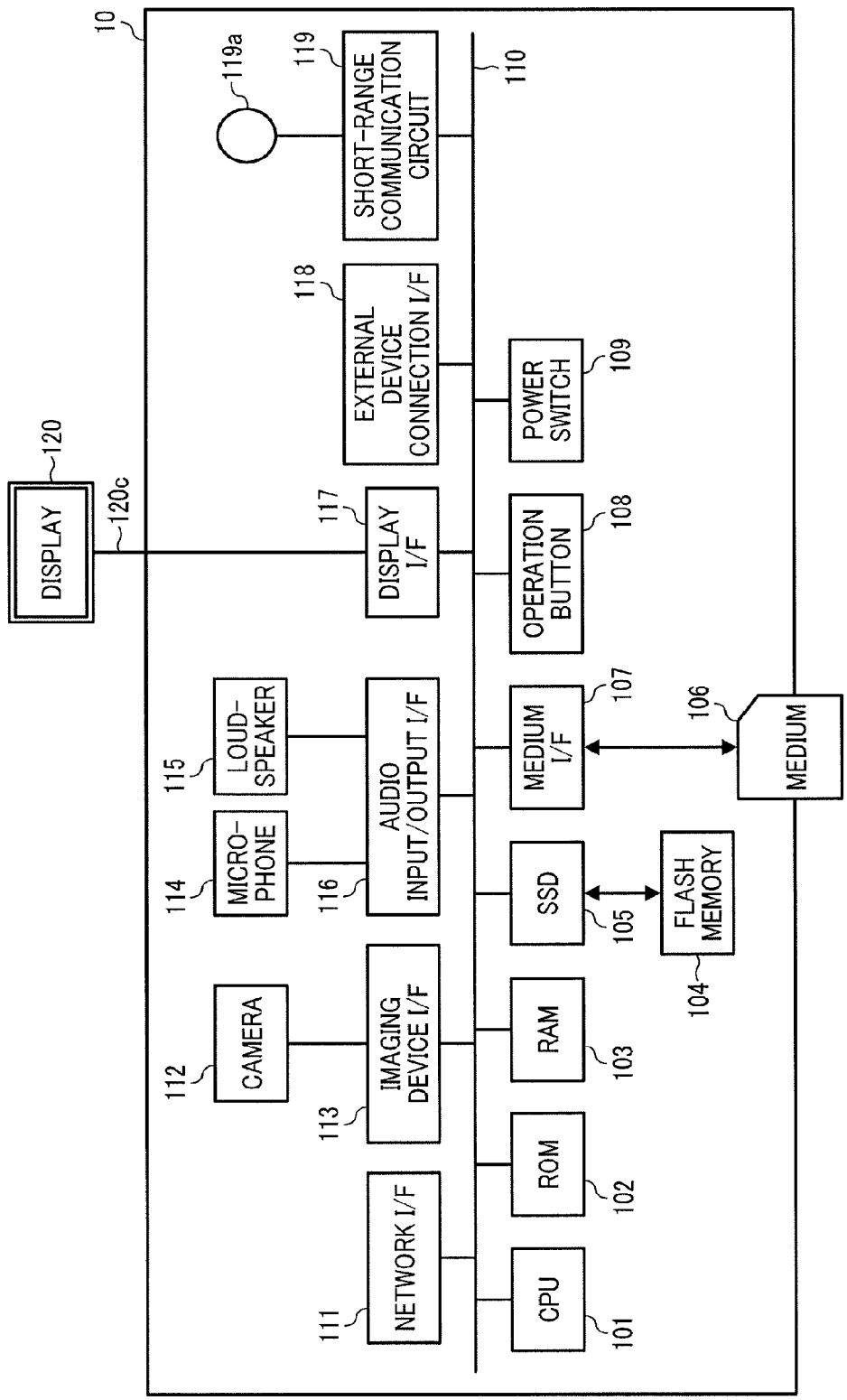
FIG. 2 is a schematic block diagram illustrating a hardware configuration of a video conference terminal according to an embodiment of the present invention.

FIG. 2 is a schematic block diagram illustrating the hardware configuration of a video conference terminal according to the present embodiment. As illustrated in FIG. 2, the video conference terminal, which is given as an example of the communication terminal 10 according to the present embodiment, includes a central processing unit (CPU) 101, a read only memory (ROM) 102, a random access memory (RAM) 103, a flash memory 104, a solid state disk (SSD) 105, a media interface (I/F) 107, an operation key 108, a power switch 109, a bus line 110, a network interface (I/F) 111, a camera 112, an imaging device interface (I/F) 113, a microphone 114, a loudspeaker 115, an audio input and output interface (I/F) 116, a display interface (I/F) 117, an external device connection interface (I/F) 118, a short-range communication circuit 119, and an antenna 119a of the short-range communication circuit 119. The CPU 101 controls the overall operation of the communication terminal 10. The ROM 102 stores a control program used for operating the CPU 101 such as an Initial Program Loader (IPL). The RAM 103 is mainly used as a work area in which the CPU 101 executes a program. The flash memory 104 stores various kinds of data such as a communication control program, image data, and audio data. The SSD 105 controls reading or writing of various kinds of data to or from the flash memory 104 under the control of the CPU 101. As an alternative to the SSD, a hard disk drive (HDD) may be used. The medium interface 107 controls reading or writing of data with respect to a recording medium 106 such as a flash memory. The operation key 108 is operated by a user to input a user instruction such as a user selection of a destination of the communication terminal 10. The power switch 109 turns on or turns off the power of the communication terminal 10.

The network interface 111 allows communication of data with an external device through a communication network 4 such as the Internet. The camera 112 is an example of a built-in imaging device that captures a subject under the control of the CPU 101 to obtain image data. The imaging device interface 113 is a circuit that controls the driving of the camera 112. The microphone 114 is an example of a built-in sound collector capable of receiving the audio. The audio input and output interface 116 is a circuit for inputting or outputting an audio signal between the microphone 114 and the loudspeaker 115 under the control of the CPU 101. The display interface (I/F) 117 is a circuit that sends the image data to an external display 120 according to the control made by the CPU 101. The external device connection interface 118 is an interface circuit that connects the communication terminal 10 to various kinds of external devices. The short-range communication circuit 119 is a communication circuit such as a near-field communication (NFC; Registered Trademark) or Bluetooth (Registered Trademark).

The bus line 110 is, for example, an address bus or a data bus, which electrically connects various elements such as the CPU 101 illustrated in FIG. 2.

The display 120 may be a liquid crystal or organic electroluminescence (EL) display that displays an image of a subject, an operation icon, or the like. The display 120 is connected to the display interface (I/F) 117 via a cable 120c. The cable 120c may be an analog red green blue (RGB) (video graphic array (VGA)) signal cable, a component video cable, a high-definition multimedia interface (HDMI, registered trademark) signal cable, or a digital video interactive (DVI) signal cable.

The camera 112 includes a lens and a solid-state image sensing device that converts an image (video) of a subject into electronic data by converting light to electric charge. As the solid-state image sensing device, for example, a complementary metal-oxide-semiconductor (CMOS) or a charge-coupled device (CCD) is used. The external device connection interface 118 is capable of connecting an external device such as an external camera, an external microphone, or an external loudspeaker through a Universal Serial Bus (USB) cable or the like. In cases where an external camera is connected, the external camera is driven on a priority basis and the built-in camera 112 is not driven under the control of the CPU 101. In a similar manner to the above, in the case where an external microphone is connected or an external loudspeaker is connected, the external microphone or the external loudspeaker is driven under the control of the CPU 101 on a top-priority basis over the built-in microphone 114 or the built-in loudspeaker 115.

The recording medium 106 is removable from the communication terminal 10. In addition, a nonvolatile memory that reads or writes data under the control of the CPU 101 is not limited to the flash memory 104, and for example, an electrically erasable and programmable read-only memory (EEPROM) may be used instead.

<Hardware Configuration of Communication Management System and Relay Device>

Figure 3:
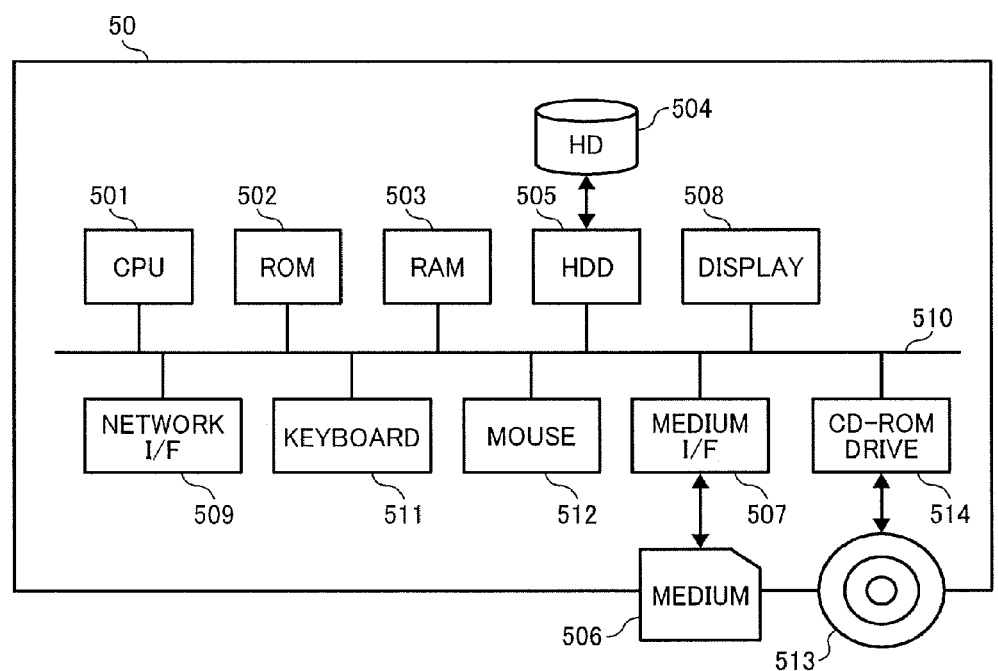
FIG. 3 is a schematic block diagram illustrating a hardware configuration of a communication management system and the relay device according to an embodiment of the present invention.

FIG. 3 is a schematic block diagram illustrating the hardware configuration of the communication management system 50 and the relay device 30 according to the present embodiment. A server computer, which is an example of the communication management system 50, includes a CPU 501, a ROM 502, a RAM 503, a hard disk (HD) 504, a hard disk drive (HDD) 505, a recording medium 506, a medium interface (I/F) 507, a display 508, a network interface (I/F) 509, a keyboard 511, a mouse 512, a compact disc read-only memory (CD-ROM) drive 514, and a bus line 510.

The CPU 501 controls entire operation of the communication management system 50. The ROM 502 stores a control program for controlling the CPU 501 such as an IPL. The RAM 503 is mainly used as a work area in which the CPU 501 executes a program. The HD 504 stores various kinds of data such as the communication management program. The HDD 505 controls reading or writing of various kinds of data to or from the HD 504 under control of the CPU 501. The medium interface 507 controls reading or writing of data with respect to a recording medium 506 such as a flash memory. The display 508 displays various kinds of information such as a cursor, menu, window, characters, or image. The network interface 509 is an interface for communicating data with an external device through the communication network 4 such as the Internet. The keyboard 511 is one example of input device provided with a plurality of keys for allowing a user to input characters, numerical values, or various kinds of instructions. The mouse 512 is one example of input device for selecting or executing various kinds of instructions, selecting an object to be processed, or for moving a cursor. The CD-ROM drive 514 reads or writes various kinds of data on a CD-ROM 513, which is one example of removable recording medium.

The bus line 510 is, for example, an address bus or a data bus, which electrically connects various elements such as the CPU 501 illustrated in FIG. 3.

Note that the hardware configuration of the relay device 30 illustrated in FIG. 1 is similar to that of the communication management system 50, and thus the description of the hardware configuration of the relay device 30 is omitted. However, the relay device 30 stores a relay control program in the HD 504 in alternative to the management program.

<<Hardware Configuration of Electronic Whiteboard>>

Figure 4:
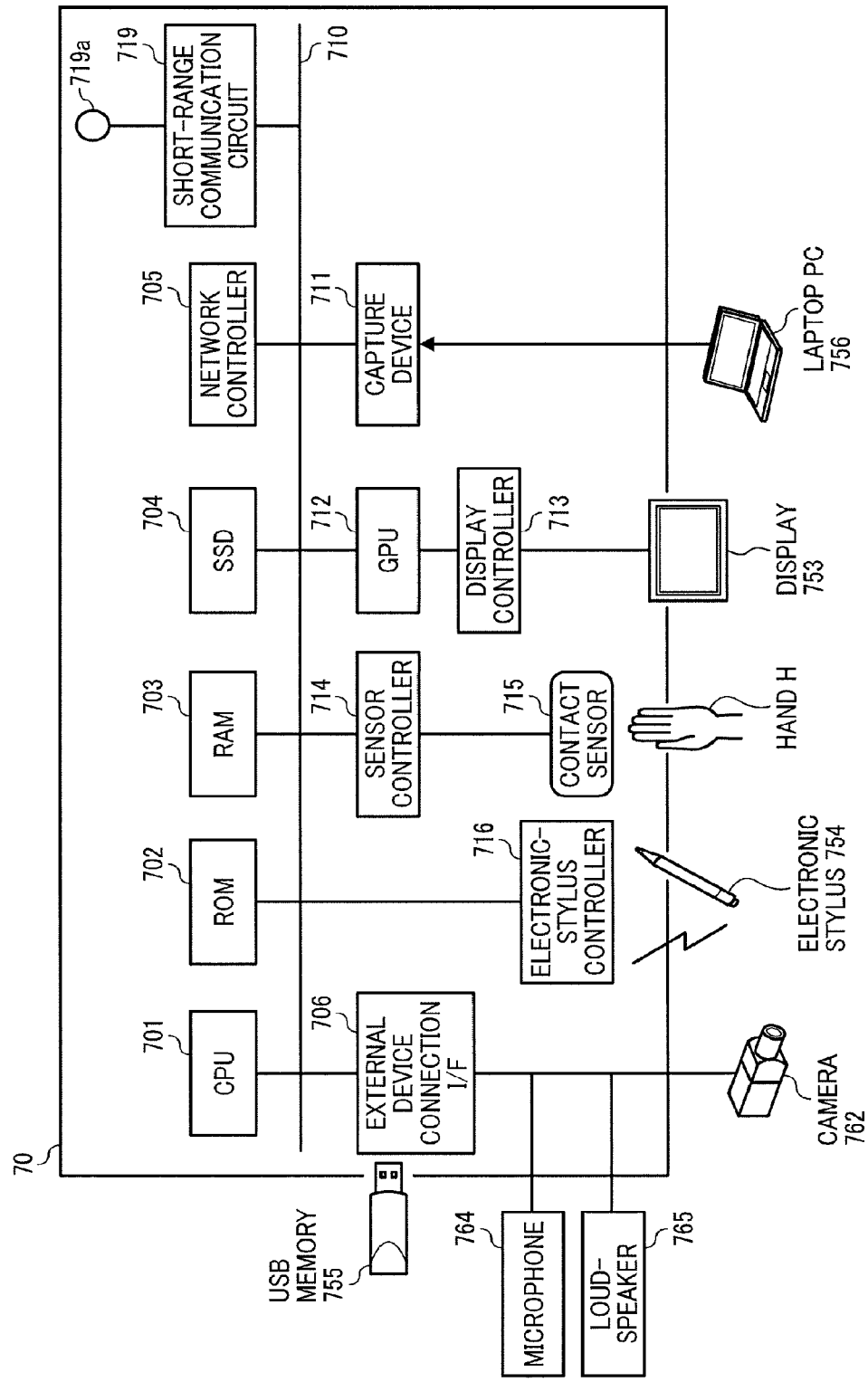
FIG. 4 is a schematic block diagram illustrating a hardware configuration of an electronic whiteboard according to an embodiment of the present invention.

FIG. 4 is a schematic block diagram illustrating the hardware configuration of an electronic whiteboard according to the present embodiment. As illustrated in FIG. 4, the electronic whiteboard, which is as an example of communication terminal 70, includes a CPU 701, a ROM 702, a RAM 703, a SSD 704, a network controller 705, and an external device connection interface (I/F) 706, which are connected through the bus line 710.

The CPU 701 controls entire operation of the electronic whiteboard. The ROM 702 stores a control program for controlling the CPU 701 such as an IPL. The RAM 703 is mainly used as a work area in which the CPU 701 executes a program. The SSD 704 stores various kinds of data such as the control program for the electronic whiteboard. The network controller 705 controls communication with an external device through the communication network 4. The external device connection interface 706 controls communication with an external device such as a USB memory 755, and external devices such as a camera 762, a loudspeaker 765, a microphone 764, etc.

The electronic whiteboard (i.e., the communication terminal 70) further includes a capture device 711, a graphics processing unit (GPU) 712, a display controller 713, a sensor controller 714, a contact sensor 715, an electronic stylus controller 716, a short-range communication circuit 719, and an antenna 719a for the short-range communication circuit 719.

The capture device 711 displays the video data on the display of a laptop personal computer (PC) 756 as a still image or moving images. The GPU 712 is a semiconductor chip specializing in processing graphics. The display controller 713 controls the visual display to output the image generated by the GPU 712 to the display 753 or the like. The contact sensor 715 detects a touch onto the display 753 with an electronic stylus 754, a user's hand H, or the like. The sensor controller 714 controls the operation of the contact sensor 715. The contact sensor 715 senses a touch input to specific coordinates on the display 735 using the infrared blocking system. More specifically, the display 753 is provided with two pairs of light receivers and light emitters disposed on both upper ends of the display 753, and a reflector frame disposed on the periphery of the display 753. The light emitters emit a plurality of infrared rays in parallel to a touch panel of the display 753. The light receivers receive lights passing in the direction that is the same as an optical path of the emitted infrared rays, which are reflected by the reflector frame. By so doing, a touch input to specific coordinates is sensed. The contact sensor 715 outputs an identifier (ID) of the infrared ray that is blocked by an object (such as the user's hand) after being emitted from the two pairs of light receivers and light emitters, to the sensor controller 714. Based on the ID of the infrared ray, the sensor controller 714 locates the coordinates of the point touched by the object. The electronic stylus controller 716 communicates with the electronic stylus 754 to detect a touch by the tip or bottom of the electronic stylus 754 to the display 753. The short-range communication circuit 719 is a communication circuit that communicates in compliance with the NFC (Registered Trademark), the Bluetooth (Registered Trademark), or the like.

The bus line 710 is, for example, an address bus or a data bus, which electrically connects various elements such as the CPU 701 illustrated in FIG. 4.

Note that contact sensor 715 is not limited to the infrared blocking system type, but may be a various types of detector, such as a capacitance touch panel that identifies the contact position by detecting a change in capacitance, a resistive membrane touch panel that identifies the contact position by detecting a change in voltage of two resistance films that are opposed to each other, or an electromagnetic induction touch panel that identifies the contact position of an object by detecting electromagnetic induction caused by contact with display. In addition or in alternative to detecting a touch by the tip or bottom of the electronic stylus 754, the electronic stylus controller 716 may also detect a touch by another part of the electronic stylus 754, such as a part held by a hand.

<Hardware Configuration of Smartphone>

Figure 5:
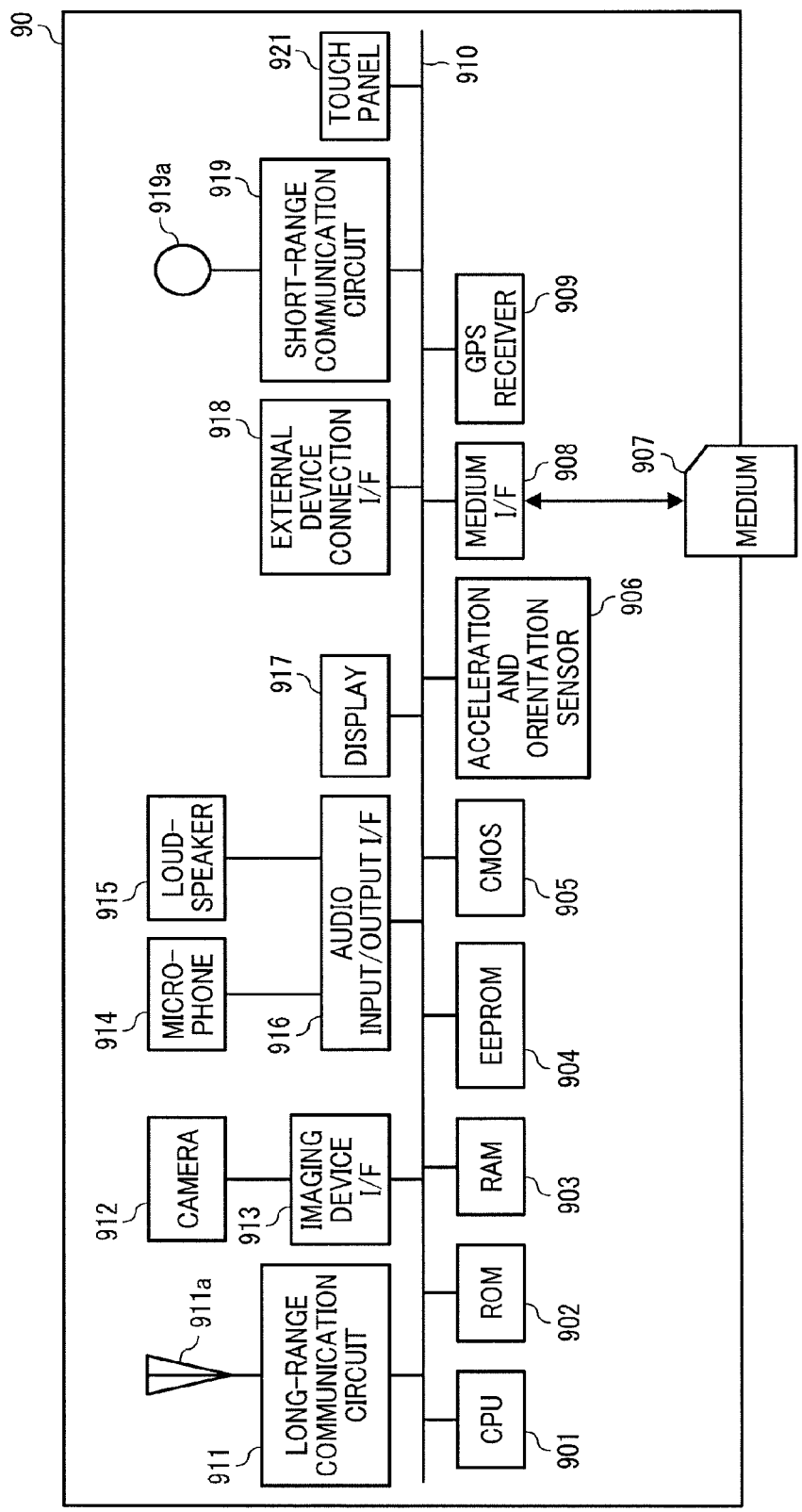
FIG. 5 is a schematic block diagram illustrating a hardware configuration of a smartphone according to an embodiment of the present invention.

FIG. 5 is a schematic block diagram illustrating the hardware configuration of a smartphone according to the present embodiment. As illustrated in FIG. 5, a smartphone, which is an example of the mobile station 90, includes a CPU 901, a ROM 902, a RAM 903, a Electrically Erasable and Programmable ROM (EEPROM) 904, a Complementary Metal Oxide Semiconductor (CMOS) sensor 905, an acceleration and orientation sensor 906, a medium interface (I/F) 908, and a GPS receiver 909, which are connected through a bus line 910.

The CPU 901 controls the overall operation of the smartphone (i.e., the mobile station 90). The ROM 902 stores a program used for driving the CPU 901, the information processing language (IPL), or the like. The RAM 903 is mainly used as a work area in which the CPU 901 executes a program. The EEPROM 904 reads or writes various kinds of data such as a mobile station control program under control of the CPU 901. The CMOS sensor 905 captures an object under the control of the CPU 901 to obtain captured image data. The acceleration and orientation sensor 906 includes various kinds of sensors such as an electromagnetic compass or gyrocompass for detecting geomagnetism and an acceleration sensor. The medium interface 908 controls reading or writing of data with respect to a recording medium 907 such as a flash memory. The GPS receiver 909 receives a GPS signal from a GPS satellite.

The smartphone further includes a long-range communication circuit 911, a camera 912, an imaging device interface (I/F) 913, a microphone 914, a loudspeaker 915, an audio input and output interface (I/F) 916, a display 917, an external device connection interface (I/F) 918, a short-range communication circuit 919, an antenna 919a of the short-range communication circuit 919, and a touch panel 921.

The long-range communication circuit 911 is a circuit that communicates with the other device through a communication network 2 such as the mobile communication network. The camera 912 is an example of a built-in imaging device that captures a subject under the control of the CPU 901 to obtain image data. The imaging device interface 913 is a circuit that controls the driving of the camera 912. The microphone 914 is an example of a built-in sound collector capable of inputting audio. The audio input and output (input/output) interface (I/F) 916 is a circuit for inputting or outputting an audio signal between the microphone 914 and the loudspeaker 915 under the control of the CPU 901. The display 917 may be a liquid crystal or organic electro luminescence (EL) display that displays an image of a subject, various kinds of icons, or the like. The external device connection interface 918 is an interface circuit that connects the mobile station 90 to various kinds of external devices. The short-range communication circuit 919 is a communication circuit that communicates in compliance with the NFC (Registered Trademark), the Bluetooth (Registered Trademark), or the like. The touch panel 921 is an example of an input device to operate a smartphone by touching the screen of the display 917.

The bus line 910 is, for example, an address bus or a data bus, which electrically connects various elements such as the CPU 901 illustrated in FIG. 5.

Note that the mobile station 90 is not limited to a smartphone, but may be implemented, for example, by a tablet PC, a smart watch, a mobile phone, and a portable game machine.

Further, the above-described control program is a file in an installable format or executable format, and may be recorded on a computer-readable recording medium for distribution. Examples of the recording medium include, but not limited to, Compact Disc Recordable (CD-R), Digital Versatile Disc (DVD), Blu-ray disc, and SD card.

<<Schematic Configuration of Communication System>>

Next, the schematic configuration of a communication system according to the present embodiment is described with reference to FIG. 6.

Figure 6:
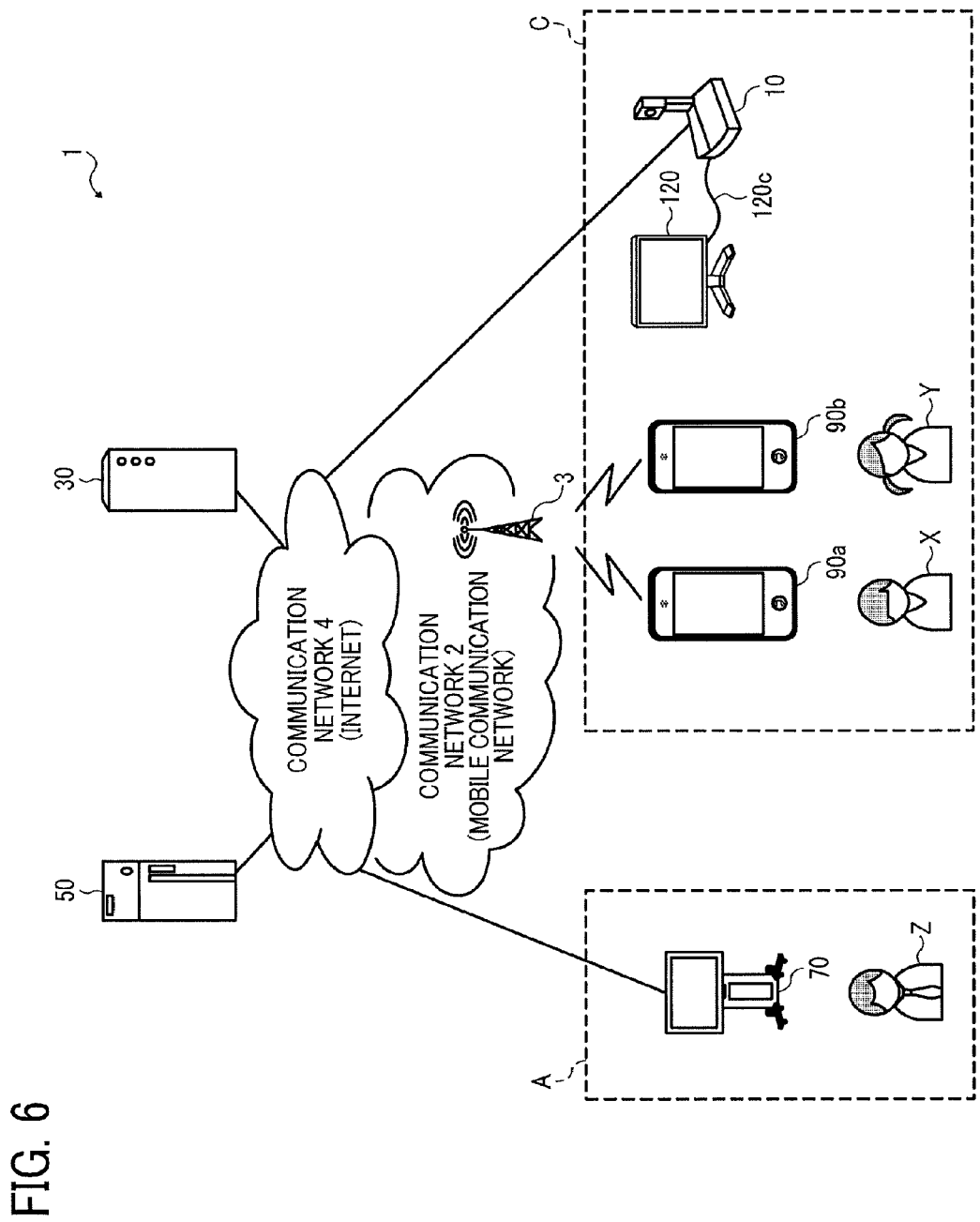
FIG. 6 is a diagram illustrating a schematic network configuration of a communication system according to an embodiment of the present invention.

FIG. 6 is a diagram illustrating a schematic configuration of a communication system according to the present embodiment of the present invention.

In FIG. 6, a communication terminal 70a, a mobile station 90a, and a mobile station 90b are used at a site A, and the communication terminal 10 is used at a site C. For example, it is assumed that the base A and the base C are Japan and the U.S., respectively. The communication terminal 70a is used as a shared communication terminal for a user X and a user Y, and is basically installed in the site A. Hereinafter, the communication terminal 70a may be referred to as a shared communication terminal.

The mobile station 90a is an example of the mobile station 90, and is personalized to the user X. Moreover, the mobile station 90b is an example of the mobile station 90, and is personalized to the user Y. On the other hand, the communication terminal 10 is used as a shared communication terminal for a user Z, and is basically installed in the site C. Hereinafter, the communication terminal 10 may also be referred to as a shared communication terminal.

The mobile station 90a and the mobile station 90b can perform streaming communication to exchange contents of data with the communication terminal 70a or the communication terminal 10 via a base station 3, a communication network 2 such as a mobile communication network, and a communication network 4 including the Internet. Due to such streaming communication, for example, video conference, or a lecture and questions can be achieved between one site and another site.

Further, the communication terminal 70a, the relay device 30, the communication management system 50, and the communication terminal 10 can perform streaming communication to exchange contents of data with each other via the communication network 4. Note also that the communication networks 2 and 4 may each include a wireless network.

<<Functional Configuration of Embodiment>>

Next, the functional configuration according to the present embodiment is described with reference to FIG. 2 to FIG. 5, FIG. 7, and FIG. 8.

Figure 7:
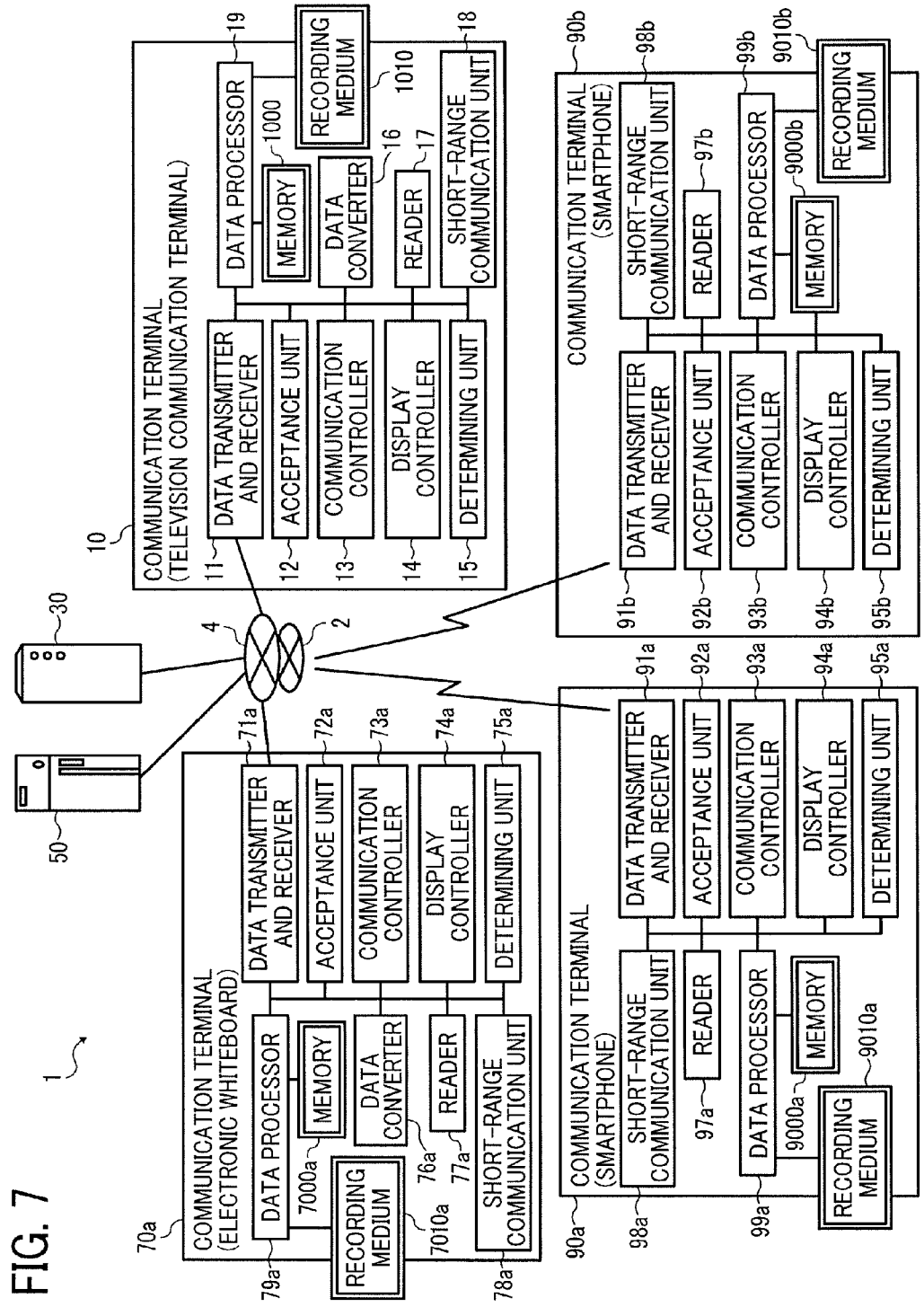
FIG. 7 is a functional block diagram of a communication system according to an embodiment of the present invention.
Figure 8:
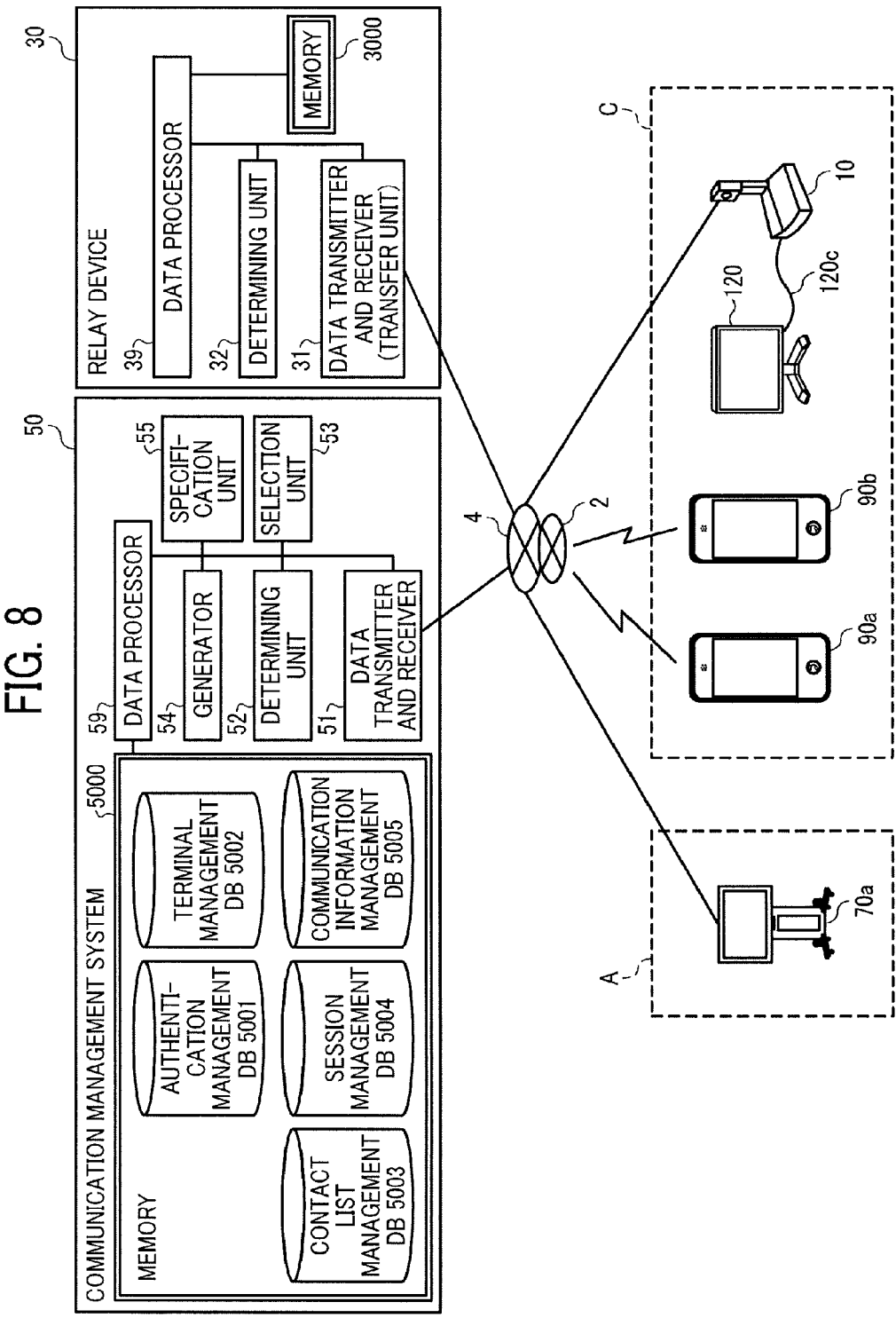
FIG. 8 is a functional block diagram of a communication system according to an embodiment of the present invention.

FIG. 7 and FIG. 8 are functional block diagrams of the communication system according to the present embodiment.

<Functional Configuration of Communication Terminal 10>

As illustrated in FIG. 7, the communication terminal 10 includes a data transmitter and receiver 11, an acceptance unit 12, a communication controller 13, a display controller 14, a determining unit 15, a short-range communication unit 18, a reader 17, a short-range communication unit 18, and a data processor 19. These elements are functions that are implemented by or caused to function by operating some of the hardware components illustrated in FIG. 2 executed by the instructions from the CPU 101 in accordance with a communication control program expanded from the flash memory 104 onto the RAM 103. The communication terminal 10 further includes a memory 1000 configured by the RAM 103 illustrated in FIG. 2, and the flash memory 104 illustrated in FIG. 2.

<Detailed Functional Configuration of Communication Terminal 10>

Next, the components of the communication terminal 10 are described. The data transmitter and receiver 11 is implemented by the instructions from the CPU 101, the network interface 111, and the external device connection interface 118, each of which is illustrated in FIG. 2, and transmits or receives various kinds of data (or information) to or from the other terminal, apparatus, or system, through the communication network 4. Before starting communication with an external communication terminal, the data transmitter and receiver 11 starts receiving terminal status information indicating the operating status of each communication terminal as a candidate counterpart, from the communication management system 50. The status information does not only indicate the operating status of each communication terminal (whether the communication terminal is in an online or offline (disconnected) state), but also indicates a detailed state such as whether an online communication terminal can actually be reached, whether the online communication terminal is currently communicating with another terminal, and whether the user of the online communication terminal is temporarily absent. Hereinafter, the case in which the status information indicates the operating status is described by way of example.

The acceptance unit 12 is substantially implemented by the instructions from the CPU 101, the operation key 108, and the power switch 109, each of which is illustrated in FIG. 2, and receives various kinds of input.

The communication controller 13 is implemented by the instructions of the CPU 101, and any desired device relating to input or output of contents of data. In one example, the communication control 13 is implemented by the instructions of the CPU 101 illustrated in FIG. 2 and by the camera 112 and the imaging device interface 113 illustrated in FIG. 2. The communication control 13 captures an image of a subject and outputs image data obtained by capturing the image. In one example, the communication controller 13 is implemented by the instructions of the CPU 101 illustrated in FIG. 2 and by the audio input and output interface 116 illustrated in FIG. 2. After the sound of the user is converted to an audio signal by the microphone 114, the communication controller 13 receives audio data according to this audio signal. Further, the communication controller 13 is implemented by the instructions of the CPU 101 illustrated in FIG. 2 and by the audio input and output interface 116 illustrated in FIG. 2, and outputs the audio signal according to the audio data to the loudspeaker 115, and the loudspeaker 115 outputs audio.

The display control 14 is substantially implemented by the instructions of the CPU 101 illustrated in FIG. 2 and by the display interface 117 illustrated in FIG. 2. The display control 14 combines received images of different resolutions and transmits the combined image to the display 120. The display control 14 may also transmit contact list information received from the communication management system 50 to the display 120, to control the display 120 to the contact list thereon.

The determining unit 15 is substantially implemented by the instructions from the CPU 101 illustrated in FIG. 2, and determines whether the local terminal (i.e., the communication terminal 10) can start streaming communication with a counterpart shared communication terminal or is already performing streaming communication with a counterpart shared communication terminal.

The data converter 16 is substantially implemented by the instructions from the CPU 101 illustrated in FIG. 2, and converts the drawing data into, for example, data of Portable Document Format (PDF) file.

Note also that the drawing data is an example of reference-material data. The reference-material data includes, for example, data such as PDF file, and data generated by word processing software, spreadsheet software, or presentation software. Note that the PDF file format is an example of well-known prescribed file format. Such prescribed file format includes, for example, plain text (.txt), rich text format (RTF), bitmap (BMP), graphic interchange format (GIF), Joint Photographic Experts Group (JPEG), tagged image file format (TIFF), Moving Picture Experts Group (MPEG), Audio Video Interleaved (AVI), MPEG Audio Layer III (MP3), Windows Media Audio (WMA), and Advanced Audio Coding (ACC). Note also that the reference-material data is not played in real time at a plurality of sites, unlike streaming communication of contents of data. Instead, the reference-material data is uploaded and downloaded in the file format as listed above at the multiple sites, and then is temporarily stored for replay on an as-needed basis.

The reader 17 is substantially implemented by the instructions from the CPU 101, and any desired device relating to input or output of contents of data. In one example, the reader 17 is implemented by the instructions from the CPU 101, the camera 112, and the imaging device interface 113, each of which is illustrated in FIG. 2, and reads a bar code such as a Quick Response (QR) code (registered trademark) to obtain the data indicated by the bar code.

The short-range communication unit 18 is substantially implemented by the instructions from the CPU 101, and the short-range communication circuit 119 with the antenna 119a, each of which is illustrated in FIG. 2, and transmits (provides) data and receives (obtains) data to or from another terminal provided with a short-range communication unit by short-range radio communication.

The data processor 19 is substantially implemented by the instructions from the CPU 101 and the SSD 105 illustrated in FIG. 2, and stores various kinds of data in the memory 1000 or the recording medium 1010 or to read various kinds of data stored in the memory 1000 or the recording medium 1010.

Further, every time image data and audio data are received in performing communication with an external communication terminal, the received image data and audio data are overwritten and stored in the memory 1000. The display 120 displays an image based on image data before being overwritten, and the loudspeaker 115 outputs audio based on audio data before being overwritten. The recording medium 1010 is implemented by the USB recording medium 106 illustrated in FIG. 2.

Note that terminal ID in the present embodiment is an example of terminal identification information that is used to uniquely identify the communication terminal 10. Such terminal identification information includes a language, a character, a symbol, or various kinds of marks. For example, a combination of at least two of the above-mentioned language, character(s), symbol(s), and various marks may be used as terminal ID. Instead of terminal ID, a user ID for identifying the user at the communication terminal 10 may be used. In such cases, terminal identification information includes not only the terminal ID but also the user ID. The user ID may include the national identification numbers (so-called "my number" in Japan) in the Japanese national identification number system.

<Functional Configuration of Relay Device>

As illustrated in FIG. 8, the relay device 30 includes a data transmitter and receiver 31 that also serves as a transfer unit, a determining unit 32, and a data processor 39. These units are functions implemented by or caused to function by operating some of the elements illustrated in FIG. 3 under the control of the instructions from the CPU 501. Note also that such instructions from the CPU 501 are made in accordance with the relay program expanded from the HD 504 to the RAM 503. The relay device 30 also includes a memory 3000 implemented by the RAM 503 illustrated in FIG. 3 and/or the HD 504 illustrated in FIG. 3.

<Detailed Functional Configuration of Relay Device>

Next, the functional configuration of the relay device 30 is described in detail. In the following description of the functional configuration of the relay device 30, the relation of the hardware elements in FIG. 3 with the functional configuration of the relay device 30 in FIG. 8 will also be described.

The data transmitter and receiver 31 of the relay device 30 illustrated in FIG. 8 is implemented by the instructions from the CPU 501 illustrated in FIG. 3 and by the network interface 509 illustrated in FIG. 3, and transmits or receives various kinds of data (or information) to or from another terminal, device, or system, via the communication network 4. The data transmitter and receiver 31 also serves as a transferor to transfer the image data and audio data transmitted from a prescribed communication terminal (such as the communication terminal 10) to another communication terminal (such as the communication terminal 70*a*).

The determining unit 32 is implemented by the instructions from the CPU 501 illustrated in FIG. 3, and determines delay of data transmission or the like.

The data processor 39 is implemented by the instructions from the CPU 501 illustrated in FIG. 3 and the HDD 505 illustrated in FIG. 3, and stores various kinds of data in the memory 3000 or read various kinds of data stored in the memory 3000.

<Functional Configuration of Communication Management System>

As illustrated in FIG. 8, the communication management system 50 includes a data transmitter and receiver 51, a determining unit 52, a selection unit 53, a generator 54, a specification unit 55, and a data processor 59. These units are functions implemented by or caused to function by operating some of the elements illustrated in FIG. 3 under the control of the instructions from the CPU 501. Note also that such instructions from the CPU 501 are made in accordance with the communication management program expanded from the HD 504 to the RAM 503. The communication management system 50 also includes a memory 5000 that is configured by the HD 504 illustrated in FIG. 3.

<Authentication Management Table>

FIG. 9 is a diagram illustrating an authentication management table according to the present embodiment. In the memory 5000, as illustrated in FIG. 9, an authentication management database (DB) 5001 that is made of an authentication management table is stored. The authentication management table stores, for each one of the communication terminals 10, 70, and 90 managed by the communication management system 50, the terminal ID and the password in association with each other. For example, the authentication management table illustrated in FIG. 9 indicates that the terminal ID of the communication terminal 70*a*, which is a kind of the communication terminal 70, is "01aa", and the password of the communication terminal 70*a* is "aaaa". Such a password is an example of authentication data, and the authentication data may include an access token.

<Terminal Management Table>

FIG. 10 is a diagram illustrating a terminal management table according to the present embodiment.

In the memory 5000, as illustrated in FIG. 10, a terminal management database (DB) 5002 that is made of a terminal management table is stored. The terminal management table stores, for the terminal ID of each one of the communication terminals (such as the communication terminals 10, 70*a*, 90*a*, and 90*b*) managed by the communication management system 50, the contact name when each of the communication terminals 10, 70*a*, 90*a*, and 90*b* serves as a counterpart communication terminal, the operating status of the communication terminals 10, 70*a*, 90*a*, and 90*b*, the date and time when a login request, as will be described later, is received at the communication management system 50, and the IP address of each of the communication terminals 10, 70*a*, 90*a*, and 90*b*, in association with one another. For example, the terminal management table illustrated in FIG. 10 indicates that the communication terminal 70*a* with the terminal ID "01aa" has the terminal name "AA terminal, Tokyo office, Japan", the operating status "online (communicating)", the date and time received at which a login request is received by the communication management system 50 "2015.4.10.13:40", and the IP address "1.2.1.3". Note that the terminal ID, the contact name, and the terminal IP address in the terminal management table as depicted in FIG. 10 are stored in the communication management system 50 when the communication management system 50 accepts registration of each of the communication terminals 10, 70*a*, 90*a*, and 90*b* that requests services from the communication management system 50.

<Contact List Management Table>

FIG. 11 is a diagram illustrating a contact list management table according to the present embodiment.

In the memory 5000, as illustrated in FIG. 11, a contact list management database (DB) 5003 that is made of a contact list management table is stored. In the contact list management table, the terminal ID of starting communication terminals that request the startup of communication is all associated with the terminal ID of counterpart communication terminals registered as candidate counterparts. For example, the contact list management table illustrated in FIG. 11 indicates that candidate counterparts to which a starting communication terminal (i.e., the communication terminal 70*a*) whose terminal ID is "01aa" can send a request to start communication in a video conference are, for example, the counterpart communication terminal (i.e., the mobile station 90*a*) whose terminal ID is "01ab", a communication terminal 10*ba* whose terminal ID is "01ba", a communication terminal 10*bb* whose terminal ID is "01bb", and the communication terminal 10 whose terminal ID is "01ca". The candidate counterparts are updated by addition or deletion in response to an adding or deleting request received from any starting communication terminal to the communication management system 50.

The contact list is just one example of contact information indicating a candidate of counterpart communication terminals, such that the contact information may be managed in various ways other than in the form of contact list, as long as the counterpart terminal information such as terminal ID of a candidate counterpart is associated with the starting communication terminal.

<Session Management Table>

FIG. 12 is a diagram illustrating a session management table according to the present embodiment.

In the memory 5000, as illustrated in FIG. 12, a session management database (DB) 5004 that is made of a session management table is stored. In the session management table, the relay device ID of the relay device 30 to be used, the terminal ID of a starting communication terminal, the terminal ID of a counterpart communication terminal, the delay time (millisecond (ms)) in reception when image data is received by the counterpart communication terminal, and date and time when the delay information indicating the delay time is sent from the counterpart communication terminal and is received at the communication management system 50 are associated with each communication session ID that identifies the session of streaming communication between each communication terminal and relay device 30. For example, the session management table illustrated in FIG. 12 indicates that the session is performed using the session ID "se01", the relay device (with the relay device ID "111a") relays image data and audio data between the starting communication terminal (i.e., the communication terminal 70*a*) with the terminal ID "01aa" and the counterpart communication terminal (i.e., the communication terminal 10) with the terminal ID "01ca", and that the delay time of the image data at the counterpart communication terminal (terminal 10*db*) at "2015.4.10.13:41" is 200 ms.

<Communication Information Management Table>

FIG. 13 is a diagram illustrating a communication information management table according to the present embodiment.

In the memory 5000, as illustrated in FIG. 13, a communication information management database (DB) 5005 that is made of a communication information management table is stored. In the communication information management table, the terminal ID of a shared communication terminal and the terminal ID of personal communication terminals are each associated with communication ID that identifies the streaming communication performed between the communication terminals and the relay device 30. Note that the shared communication terminal performs streaming communication, and the personal communication terminals are owned by users who use the shared communication terminal to perform a conversation or the like. Note that the communication ID is an example of communication identification information. When conference is held among a plurality of terminals, the communication ID indicates conference ID that identifies the conference. For example, the communication information management table depicted in FIG. 13 indicates that the shared communication terminal at the site A (i.e., the communication terminal 70*a*) performs streaming communication with the shared communication terminal at the site C (i.e., the communication terminal 10), for a conference or the like, in the streaming communication indicated by the communication ID "co01". Further, the communication information management table depicted in FIG. 13 indicates that a user X, who is the owner of the personal communication terminal with the terminal ID "01ab" (i.e., the mobile station 90*a*), and a user Y, who is the owner of the personal communication terminal with the terminal ID "01ac" (i.e., the mobile station 90*b*), are participating in a conference or the like at the site A.

<Detailed Functional Configuration of Communication Management System>

Next, the functional configuration of the communication management system 50 is described in detail. In the following description of the functional configuration of the communication management system 50, the relation of the hardware configuration of FIG. 3 with the functional configuration of the communication management system 50 in FIG. 8 will also be described.

The data transmitter and receiver 51 of the communication management system 50 illustrated in FIG. 8 is implemented by the instructions of the CPU 501 illustrated in FIG. 3 and by the network interface 509 illustrated in FIG. 3, and transmits or receives various types of data (or information) to or from another terminal, device, or system via the communication network 4.

The determining unit 52 is implemented by the instructions from the CPU 501 illustrated in FIG. 3, and determines, for example, whether the terminal ID received by the data transmitter and receiver 51 is stored as the terminal ID of a shared communication terminal in the communication information management table (see FIG. 13).

The selection unit 53 is implemented by the instructions from the CPU 501 illustrated in FIG. 3, and selects, based on the IP address of each of the communication terminals participating in a communication session, a relay device suited to streaming communication among terminals through the communication session.

The generator 54 is implemented by the instructions from the CPU 501 illustrated in FIG. 3, and generates communication ID according to the request to start streaming communication sent from a communication terminal.

The specification unit 55 is implemented by the instructions from the CPU 501 illustrated in FIG. 3, and specifies a communication terminal to which the drawing data is to be distributed based on the result of the determination made by the determining unit 52.

The data processor 59 is implemented by the instructions from the CPU 501 illustrated in FIG. 3 and the HDD 505 illustrated in FIG. 3, and stores various kinds of data in the memory 5000 or read various kinds of data stored in the memory 5000.

<Functional Configuration of Communication Terminal 70*a*>

As illustrated in FIG. 7, the communication terminal 70*a* includes a data transmitter and receiver 71*a*, an acceptance unit 72*a*, a communication controller 73*a*, a display controller 74*a*, a determining unit 75*a*, a data converter 76*a*, a reader 77*a*, a short-range communication unit 78*a*, and a data processor 79*a*. These units are functions implemented by or caused to function by operating some of the elements illustrated in FIG. 4 under the control of the instructions from the CPU 701. Note also that such instructions from the CPU 701 are made in accordance with the communication control program expanded from the SSD 704 to the RAM 703. The communication terminal 70*a* further includes a memory 7000 that is configured by the RAM 703 and the SSD 704 illustrated in FIG. 4.

<Detailed Functional Configuration of Communication Terminal 70*a*>

Next, the components of the communication terminal 70*a* are described. The data transmitter and receiver 71*a* is implemented by the instructions from the CPU 701, the network controller 705, and the external device connection interface 706, each of which is illustrated in FIG. 4, and exchanges various kinds of data (or information) with another communication terminal, apparatus, or system through the communication network 4. Before starting communication with other communication terminals 10, 70*d*, and 90*a*, the data transmitter and receiver 71*a* starts receiving terminal status information indicating the operating status of the communication terminals 10, 70*d*, and 90*a* as candidate counterparts, from the communication management system 50. The status information not only indicates the operating status of each communication terminal 10, 70*a*, or 90*a* (whether the communication terminal is online or offline), but also indicates a detailed state such as whether the communication terminal 10, 70*a*, or 90*a* whose state is online is now capable of communicating or is currently communicating, or the user of the communication terminal 10, 70*a*, or 90*a* is temporarily absent from the communication terminal. In addition, the status information not only indicates the operating status of each terminal, but also indicates various kinds of status, such as the state that the cable 120*c* is disconnected from the communication terminal 10, the state that some of the communication terminals 10, 70*d*, and 90*a* can output sounds but not images, or the state that some of the communication terminals 10, 70d, and 90a is muted. Hereinafter, the case in which the status information indicates the operating status is described by way of example.

Further, the data transmitter and receiver 71a may also serve as a starting unit and starts communication with another communication terminal such as the communication terminal 10.

The acceptance unit 72a is substantially implemented by the instructions from the CPU 701, the contact sensor 715, and the electronic stylus controller 716, each of which is illustrated in FIG. 4, and accepts various kinds of input.

The communication controller 73a obtains drawing data that is drawn on the display 753 using the electronic stylus 554 or the hand H, and converts the drawing data into coordinate data that serves as stroke data. Further, when the communication terminal 70a transmits the drawing data to the communication terminal 70d, for example, the communication terminal 70d controls the display 753 of the communication terminal 70d (electronic whiteboard) to display the same drawing based on the drawing data received from the communication terminal 70a.

The communication controller 73a is substantially implemented by the instructions from the CPU 701 illustrated in FIG. 4, and performs image processing on the image data of a subject captured by the camera 762. The communication controller 73 is implemented by the instructions from the CPU 701, and after the audio of the user is converted to an audio signal by the microphone 764, the communication controller 73 processes the audio data of the obtained audio signal. In another example, the communication controller 73a is implemented by the instructions from the CPU 701 illustrated in FIG. 4, and outputs the audio signal according to the audio data to the loudspeaker 765 such that the loudspeaker 765 outputs a sound.

The display control 74a is substantially implemented by the instructions of the CPU 701 illustrated in FIG. 4 and by the display controller 713 illustrated in FIG. 4. The display control 74 combines the received image data of different resolutions and transmits the combined image data to the display 753. The display control 74a may also transmit information on a contact list, received from the communication management system 50, to the display 753, and control display of the contact list on the display 753.

The determining unit 75a is substantially implemented by the instructions from the CPU 701 illustrated in FIG. 4, and determines whether any other communication terminal including a short-range communication unit is within a predetermined distance from the communication terminal 70a.

The data converter 76a is substantially implemented by the instructions from the CPU 701 illustrated in FIG. 4, and converts the drawing data into, for example, data of PDF file. In a similar manner to the above, the drawing data is an example of reference-material data.

The reader 77a is substantially implemented by the instructions from the CPU 701, the camera 762, and the external device connection interface 706, each of which is illustrated in FIG. 4, and reads a bar code such as a Quick Response (QR) code to obtain the data indicated by the bar code.

The short-range communication unit 78a is substantially implemented by the instructions from the CPU 701 and the short-range communication circuit 719 provided with the antenna 719a, each of which is illustrated in FIG. 4, and communicates with the mobile station 90 to exchange data by short-range radio communication.

The data processor 79a is substantially implemented by the instructions from the CPU 701 and the SSD 704 illustrated in FIG. 4. The data processor 79a stores various types of data in the memory 7000a or the recording medium 7010a or reads various types of data from the memory 7000a or the recording medium 7010a.

Further, every time image data and audio data are received in performing communication with another communication terminal, the memory 7000 overwrites the image data and audio data. The display 753 displays an image based on image data before being overwritten, and the loudspeaker 765 outputs audio based on audio data before being overwritten. The recording medium 7010a is implemented by the USB memory 755 that is illustrated in FIG. 4.

<Functional Configuration of Mobile Station 90a>

As illustrated in FIG. 7, the mobile station 90a includes a data transmitter and receiver 91a, an acceptance unit 92a, a communication controller 93a, a display controller 94a, a determining unit 95a, a reader 97a, a short-range communication unit 98a, and a data processor 99a. These units are functions implemented by or caused to function by operating some of the elements illustrated in FIG. 5 under the control of the instructions from the CPU 901. Note also that such instructions from the CPU 901 are made in accordance with the communication control program expanded from the EEPROM 904 to the RAM 903. The mobile station 90a further includes a memory 9000a configured by the RAM 903 illustrated in FIG. 5 and the EEPROM 904 illustrated in FIG. 5.

<Detailed Functional Configuration of Mobile Station 90a>

Next, the components of the mobile station 90a are described. The data transmitter and receiver 91a is substantially implemented by the instructions from the CPU 901 and the long-range communication circuit 911 with the antenna 911a, each of which is illustrated in FIG. 5. The data transmitter and receiver 91a exchanges various types of data, such as communication data, with another communication terminal, apparatus, or system through the communication network 2.

The acceptance unit 92a is substantially implemented by the instructions of the CPU 901 illustrated in FIG. 5 and by the touch panel 921 illustrated in FIG. 5, and receives various kinds of inputs from the user.

The communication controller 93a is implemented by the instructions from the CPU 901 illustrated in FIG. 5 in cooperation with any desired device relating to input or output of contents of data. In one example, the communication controller 93a is substantially implemented by the instructions from the CPU 901 in cooperation with the imaging device interface 913, and applies image processing to the image of a subject captured by the camera 912. In another example, the communication controller 93a may be implemented by the instructions from the CPU 901 in cooperation with the audio input and output interface 916. After the voice of a user is converted into an audio signal by the microphone 914, the communication controller 93a processes the audio data of the obtained audio signal. In another example, the communication controller 93a may be implemented by the instructions from the CPU 901 and the audio input and output interface 916, each of which is illustrated in FIG. 5. In this example, the communication controller 93a outputs the audio signal based on the audio data to the loudspeaker 915, and the loudspeaker 915 outputs the sound.

The display control 94a is substantially implemented by the instructions from the CPU 901 illustrated in FIG. 5, and controls the display 917 to display the image data thereon.

The determining unit 95a is substantially implemented by the instructions from the CPU 901 illustrated in FIG. 5, and outputs a determination result as will be described later.

The reader 97a is substantially implemented by the instructions from the CPU 901, the camera 912, and the imaging device interface 913, each of which is illustrated in FIG. 5, and reads a bar code such as a Quick Response (QR) code to obtain the data indicated by the bar code.

The short-range communication unit 98a is substantially implemented by the instructions from the CPU 901 and the short-range communication circuit 919 provided with the antenna 919a, each of which is illustrated in FIG. 5. The short-range communication unit 98a communicates with another communication terminal to exchange data by short-range radio communication.

The data processor 99a is substantially implemented by the instructions from the CPU 901 and the EEPROM 904, each of which is illustrated in FIG. 5. The data processor 99a stores various types of data in the memory 9000a or read various types of data from the memory 9000a.

<Functional Configuration of Mobile Station 90b>

As illustrated in FIG. 7, the mobile station 90b includes a data transmitter and receiver 91b, an acceptance unit 92b, a communication controller 93b, a display controller 94b, a determining unit 95b, a reader 97b, a short-range communication unit 98b, and a data processor 99b. As these components of the mobile station 90b have the functions equivalent to those of the data transmitter and receiver 91a, the acceptance unit 92a, the communication controller 93a, the display controller 94a, the determining unit 95a, the reader 97a, the short-range communication unit 98a, and the data processor 99a of the mobile station 90a, respectively, the description is omitted.

<<Operation>>

Next, the operation of the communication system 1 according to the present embodiment is described with reference to FIG. 6, FIG. 14A to FIG. 24.

Firstly, the preparation processes for communication that the mobile station 90a performs as a login requesting terminal are described with reference to FIG. 14A, FIG. 14B, and FIG. 15.

Figure 14B:
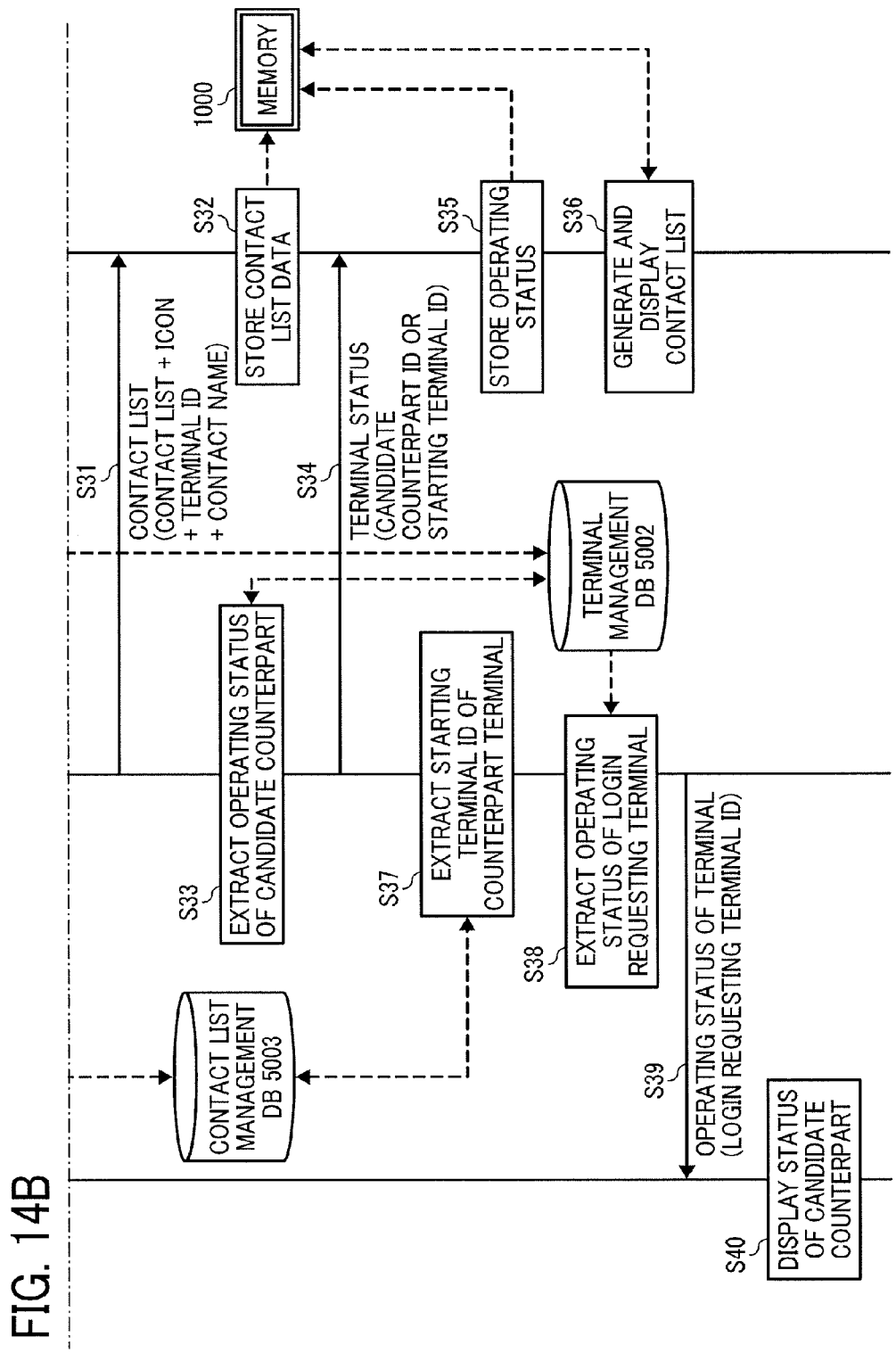

FIG. 14A and FIG. 14B are a sequence diagram illustrating the preparation processes for communication.

Figure 15A:
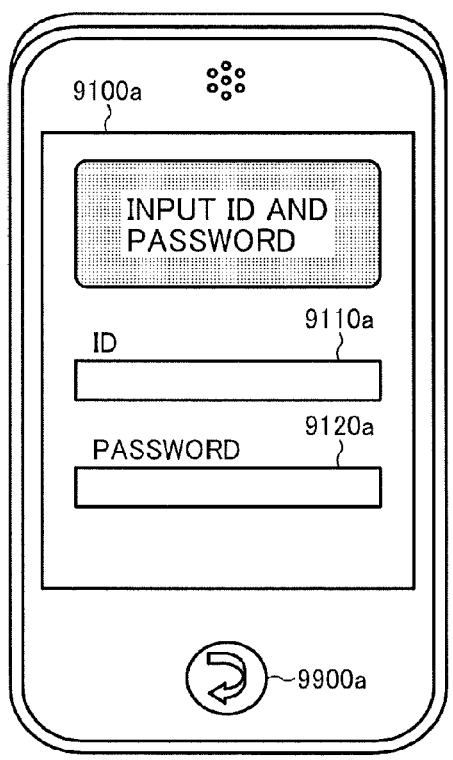
FIG. 15A illustrates an example of a login screen of the mobile station 90a, according to an embodiment of the present invention.

FIG. 15A illustrates an example of a login screen of the mobile station 90a, according to the present embodiment.

Figure 15B:
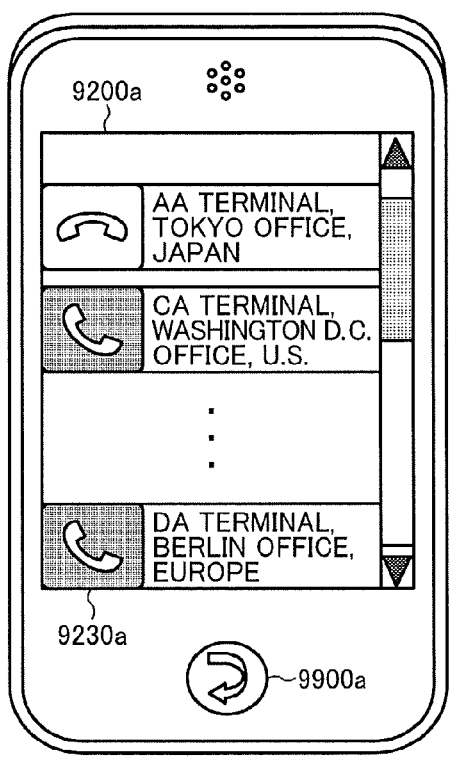
FIG. 15B illustrates an example of a contact list displayed on the mobile station 90a, according to the present embodiment.

FIG. 15B illustrates an example of a contact list displayed on the mobile station 90a, according to the present embodiment.

FIG. 15C illustrates an example of a contact list displayed on the communication terminal 10, according to the present embodiment.

Firstly, the display controller 94a of the mobile station 90a controls a display to display an initial screen 9100a, such as a login screen, as illustrated in FIG. 15A. The initial screen 9100a displays an input field 9110a to which terminal ID is to be input and an input field 9120a to which a password is to be input. Note also that a key 9900a is to be touched to make a selection or instruction. When the terminal ID and the password of the user X is input to the input field 9110a and the input field 9120a, respectively, the acceptance unit 92a receives the input of the terminal ID and the password (step S21). Then, the data transmitter and receiver 91a generates a session ID to identify the communication session (step S22).

Then, the data transmitter and receiver 91a transmits a login request indicating a login authentication request to the communication management system 50 through the communication networks 2 and 4 (step S23). The login request includes the terminal ID and the password input in the step S21.

Next, the data processor 59 of the communication management system 50 performs terminal authentication by searching the authentication management table of FIG. 9 using the terminal ID and the password included in the login request received via the data transmitter and receiver 51 as search keys, and determining whether the same terminal ID and the same password are managed in the authentication management table of FIG. 9 (step S24). In the present embodiment, it is assumed that the data processor 59 manages the same terminal ID and the same password.

When the data processor 59 manages the same terminal ID and the same password and determines that the login request is sent from an authorized terminal, the data processor 59 changes the operating status field of the terminal ID received in the step S23 as above to "online" in the record of the terminal management table (see FIG. 10), and stores, in the field of received date and time, the date and time at which the login request is received in the step S23 (step S25). For example, if the mobile station 90a has the terminal ID "01cb", the data processor 59 stores the operating status "Online" and the received date and time "2015.4.10.12:46" in association with the IP address "1.3.1.4" in the terminal management table. Note that the IP address of the communication terminal may be transmitted from the mobile station 90a in the step S23 as above instead of being registered in the terminal management table in advance.

Subsequently, the data processor 59 adds a new record including the terminal ID and password of the personal communication terminal (i.e., the mobile station 90a) of the user, which was received in the step S23 as above, in the session management table (see FIG. 12) (step S26). Then, the data transmitter and receiver 51 of the communication management system 50 transmits authentication result information indicating an authentication result obtained in the step S24 to the mobile station 90a that has sent the above-mentioned login request, via the communication network 4 and the communication network 2 (step S27).

When the data transmitter and receiver 91a of the login requesting terminal (i.e., the mobile station 90a) receives the authentication result information indicating that the mobile station 90a is an authorized terminal, the data transmitter and receiver 91a transmits a contact list request that requests a contact list to the communication management system 50 through the communication networks 4 and 2 (step S28). Accordingly, the data transmitter and receiver 51 of the communication management system 50 receives the contact list request.

Next, the data processor 59 of the communication management system 50 searches the contact list management table (see FIG. 11), using the terminal ID "01cb" of the login requesting terminal (i.e., the mobile station 90a) which has sent the login request as a search key, to extract the terminal ID of a candidate counterpart that can communicate with the login requesting terminal (i.e., the mobile station 90a). The data processor 59 of the communication management system 50 further reads out the contact name associated with each one of the extracted terminal ID from the terminal management table (see FIG. 10) (step S29). In the present embodiment, at least the terminal ID and the associated contact name, for each one of one or more candidate counterparts for the login requesting terminal (i.e., the mobile station 90a) with the terminal ID "01cb", are extracted.

Next, the data transmitter and receiver 51 of the communication management system 50 uses data processor 59 to read contact list frame data, and icon data indicating the operating status of each candidate counterpart that is read, from the memory 5000 (step S30). The data transmitter and receiver 51 further transmits the contact list information to the login requesting terminal (i.e., the mobile station 90a) (step S31). The contact list information that is read using data processor 59 includes the contact list frame data, and the icon data, the terminal ID, and the contact name. Accordingly, the data transmitter and receiver 91a of the login requesting terminal (i.e., the mobile station 90a) receives the contact list information, and the data processor 99a stores the received contact list information in the memory 9000a (step S32).

As described above, in the present embodiment, instead of managing contact list information at each communication terminal, the communication management system 50 centrally manages the contact list information for all of the communication terminals. In this way, even when a communication terminal is newly added to the communication system 1 or an existing communication terminal is replaced with a different type of communication terminal in the communication system 1, or even when the appearance of the contact list is changed, the communication management system 50 can centrally reflect such changes without requiring each communication terminal to reflect such changes in the contact list information.

The data processor 59 of the communication management system 50 searches the terminal management table (see FIG. 10) using the above extracted terminal ID of the candidate counterparts, as search keys, to obtain the operating status of the communication terminals (step S33).

Next, the data transmitter and receiver 51 of the communication management system 50 transmits terminal status information including the terminal ID that serves as the search keys used in the step S33 as described above and the operating status of the corresponding counterpart communication terminals to the starting communication terminal (i.e., the communication terminal 70a) via the communication network 4 (S34).

Next, the data processor 99a of the login requesting terminal (i.e., the mobile station 90a) sequentially stores in the memory 9000a the terminal status information received from the communication management system 50 (step S35). Based on the terminal status information received for each candidate counterpart as described above, the login requesting terminal (i.e., the mobile station 90a) can obtain the current operating status of a candidate counterpart for the login requesting terminal (i.e., the mobile station 90a) such as the operating status of the communication terminal 10.

Next, the display controller 94a of the login requesting terminal (i.e., the mobile station 90a) generates a contact list that reflects the current operating status of each candidate counterpart based on the contact list information stored in the memory 9000a and the terminal status information, and the display controller 94a displays a contact list page 9200a on the display 917, as illustrated in FIG. 15B (step S36). On the contact list page 9200a, an icon indicating the operating status of each counterpart communication terminal and the names of the destination addresses are displayed as in counterpart terminal information 9230a. In FIG. 15B, the icons each reflecting the operating status of the corresponding terminal are displayed at left side of the destination devices. In FIG. 15B, the icon indicating the operating status of a communication terminal "offline" is displayed on the top, and the icons indicating the operational status of terminals "online" are displayed below the icon of "offline".

The data processor 59 of the communication management system 50 searches the contact list management table (see FIG. 11) using the terminal ID "01cb" of the login requesting terminal (i.e., the mobile station 90a) as a search key, to extract the terminal ID of other communication terminals that register the terminal ID "01cb" of the login requesting terminal (i.e., the mobile station 90a) as a candidate counterpart (step S37). In the contact list management table illustrated in FIG. 11, the terminal ID of other communication terminals to be extracted are, for example, "01aa" and "01ca".

Next, the data processor 59 of the communication management system 50 searches the contact list management table (see FIG. 10) using the terminal ID "01cb" of the login requesting terminal (i.e., the mobile station 90a) as a search key, and obtains the operating status of the login requesting terminal (i.e., the mobile station 90a) (step S38).

Then, the data transmitter and receiver 51 transmits terminal status information including the terminal ID "01cb" and the operating status "Online" of the login requesting terminal (i.e., the mobile station 90a) obtained in the step S38 to terminals whose operating status indicates "Online" in the terminal management table (see FIG. 10) among the communication terminals with the terminal ID extracted in the step S37 (step S39). When transmitting the terminal status information to the communication terminals such as the communication terminal 10, the data transmitter and receiver 51 refers to the IP addresses of the communication terminals, which are managed in the terminal management table illustrated in FIG. 10, using the terminal ID. Accordingly, the terminal ID "01cb" and the operating status "online" of the login requesting terminal (i.e., the mobile station 90a) can be transmitted to other counterpart communication terminals that can communicate with the login requesting terminal (i.e., the mobile station 90a) as a candidate counterpart. As a result, the candidate counterpart (such as the communication terminal 10) can display the contact list page 7100a as illustrated in FIG. 15C (step S40).

On the contact list page 7100a, an icon indicating the operating status and the contact name are displayed for every counterpart communication terminal. Moreover, the contact list page 7100a displays a QR code key 7110a to be touched to display a QR code that indicates the terminal ID of the local communication terminal (i.e., the communication terminal 10). When the QR code key 7110a is touched, the display controller 14 controls a display to display a QR code.

Figure 16A:
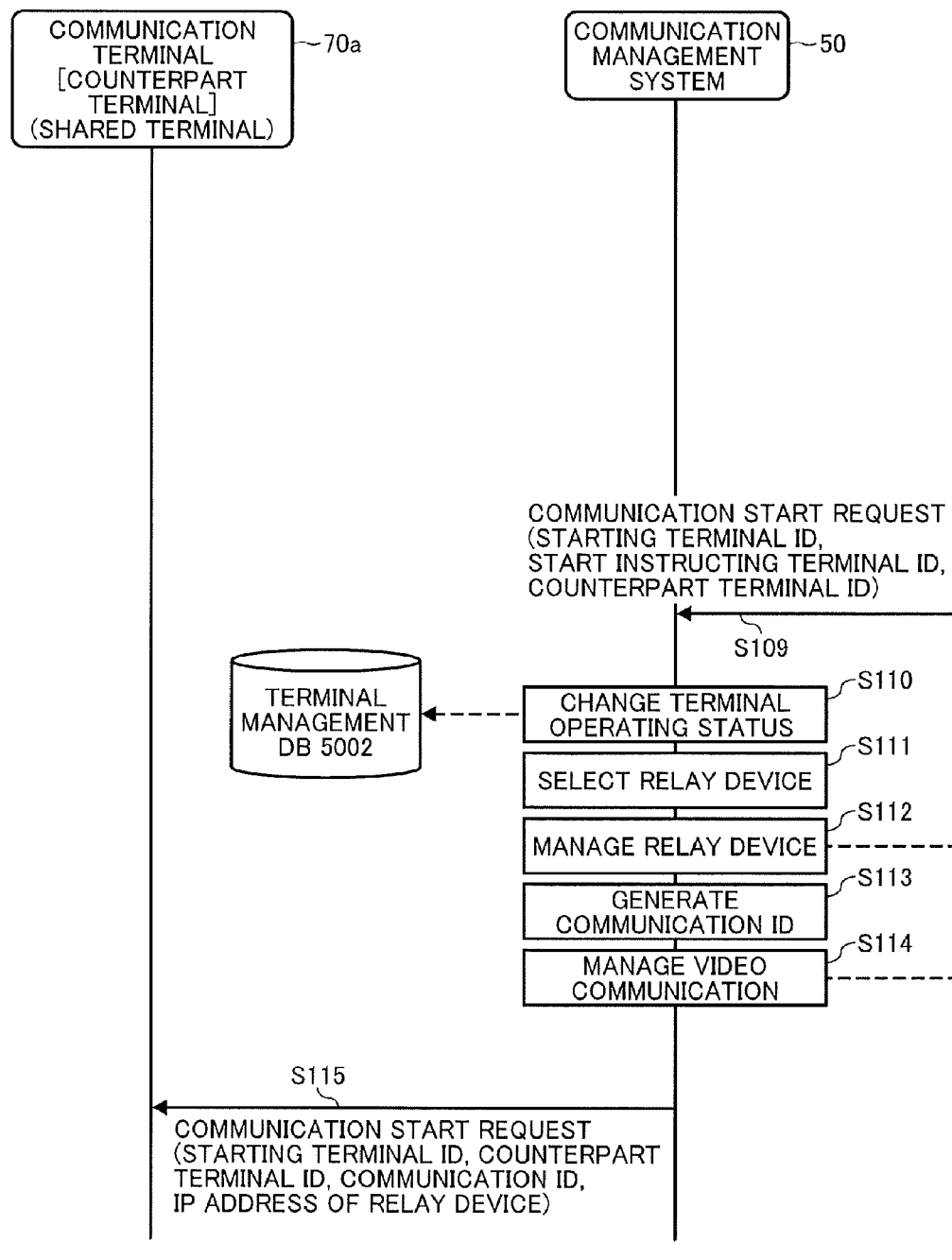
FIG. 16A and FIG. 16B are a sequence diagram illustrating the processes of starting streaming communication from a personal communication terminal through a shared communication terminal, according to an embodiment of the present invention.
Figure 16B:
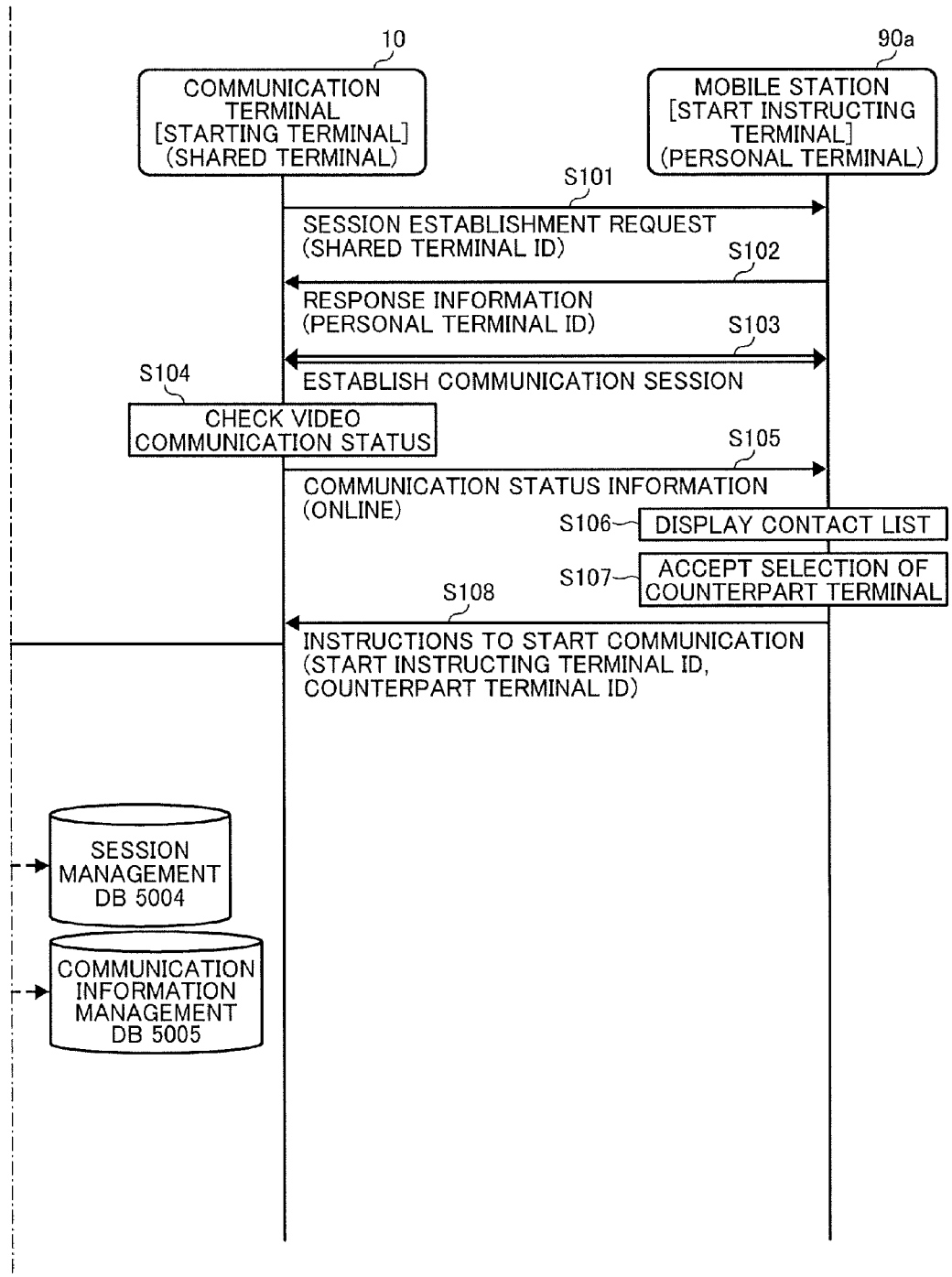

Next, with reference to FIG. 16A, FIG. 16B, and FIG. 18, cases are described where the user Z at the site A uses the shared communication terminal (i.e., the communication terminal 70a) to give a lecture to the user X and the use Y using the shared communication terminal (i.e., the communication terminal 10) at the site C.

FIG. 16A, FIG. 16B, and FIG. 18 are sequence diagrams illustrating the processes of starting streaming communication from a personal communication terminal (i.e., the mobile station 90a) to the shared communication terminal (i.e., the communication terminal 10) at the site C through the shared communication terminal (i.e., the shared communication terminal 70a) at the site A, according to the present embodiment.

Hereinafter, the description is given under the assumption that the shared communication terminal (i.e., the communication terminal 10), the personal communication terminal (i.e., the mobile station 90a), and the shared communication terminal (i.e., the communication terminal 70a) have all completed the processes in the steps S21 to S40.

Firstly, the shared communication terminal (i.e., the communication terminal 10) uses short-range radio communication such as Bluetooth to distribute a session establishment request within a prescribed area (for example, within a range of 20 meters (m) in radius) at regular time intervals (for example, for every 10 seconds) (step S101). The session establishment request includes terminal ID for identifying the shared communication terminal (i.e., the communication terminal 10). When the personal communication terminal (i.e., the mobile station 90a) enters the above-described prescribed area after the distribution, the personal communication terminal (i.e., the mobile station 90a) receives the session establishment request. Then, the data transmitter and receiver 91a of the personal communication terminal (i.e., the mobile station 90a) transmits response information to the shared communication terminal (i.e., the communication terminal 10) (step S102). Such response information includes the terminal ID of the personal communication terminal (i.e., the mobile station 90a). Accordingly, the shared communication terminal (i.e., the communication terminal 10) receives the response information. Then, a communication session between the shared communication terminal (i.e., the communication terminal 10) and the personal communication terminal (i.e., the mobile station 90a) is established by short-range radio communication (step S103).

Next, the determining unit 15 of the shared communication terminal (i.e., the communication terminal 10) checks a streaming communication status indicating whether or not the local communication terminal (i.e., the communication terminal 10) is performing streaming communication with an external communication terminal for a lecture or the like (step S104). Here, the following description is given under the assumption that no streaming communication is being performed. The data transmitter and receiver 11 of the shared communication terminal (i.e., the communication terminal 10) transmits communication status information indicating the communication status of "online" to the personal communication terminal (i.e., the mobile station 90a) (step S105). Accordingly, the data transmitter and receiver 91a of the personal communication terminal (i.e., the mobile station 90a) receives the communication status information.

FIG. 17A is an example of a contact list page displayed on a start-instructing terminal, according to the present embodiment.

FIG. 17B is an example of a contact list page displayed on a jump-in participant terminal, according to an embodiment of the present invention.

Next, the personal communication terminal (i.e., the mobile station 90a) the display controller 94a controls the display to display a contact list page 9300a as illustrated in FIG. 17A (step S106). On the contact list page 9300a, a message 9310a prompting selection of a destination device, e.g., "Please select a destination device to start streaming communication with through a shared communication terminal", and candidate counterparts for the personal communication terminal (i.e., the mobile station 90a) are displayed. Once the user X selects "AA TERMINAL, TOKYO OFFICE, JAPAN" as a counterpart communication terminal, the acceptance unit 92a accepts a selection of the destination address of streaming communication (i.e., "AA TERMINAL, TOKYO OFFICE, JAPAN" in the present embodiment) from the contact list illustrated in FIG. 17B (step S107). Accordingly, the data transmitter and receiver 91a transmits instructions to start communication to the shared communication terminal (i.e., the communication terminal 10) by short-range radio communication (step S108).

The instructions to start communication instruct the shared communication terminal (i.e., the communication terminal 10) to request to start streaming communication with a counterpart shared communication terminal (counterpart communication terminal) (i.e., the communication terminal 70a). Due to this configuration, the mobile station 90a serves as a start-instructing terminal, and the communication terminal 10 serves as a starting communication terminal. In other words, the start-instructing terminal (i.e., the mobile station 90a) instructs the starting communication terminal (i.e., the communication terminal 10) to start streaming communication with a candidate counterpart of the local communication terminal (i.e., the mobile station 90a), and the start-instructing terminal (i.e., the mobile station 90a) does not instruct the starting communication terminal (i.e., the communication terminal 10) to start streaming communication with a candidate counterpart of the starting communication terminal (i.e., the communication terminal 10).

The instructions to start communication includes the terminal ID of the personal communication terminal (i.e., the mobile station 90a) that serves as the start-instructing terminal, and the terminal ID of the counterpart communication terminal (i.e., the destination device selected as above). Accordingly, the shared communication terminal (i.e., the communication terminal 70a) receives the instructions to start communication.

Next, the data transmitter and receiver 11 of the shared communication terminal (i.e., the communication terminal 10), which serves as a starting communication terminal, transmits communication start request to the communication management system 50 (step S109). The communication start request indicates that the local communication terminal (i.e., the communication terminal 10) requests to start streaming communication with the counterpart shared communication terminal (counterpart communication terminal) (i.e., the communication terminal 70a). The communication start request includes the terminal ID of the shared communication terminal (i.e., the communication terminal 10) that serves as the starting communication terminal, the terminal ID of the start-instructing terminal (i.e., the mobile station 90a), and the terminal ID of the shared communication terminal (i.e., the communication terminal 10) that serves as the counterpart communication terminal. As a result, the data transmitter and receiver 51 of the communication management system 50 receives the communication start request.

Next, on the basis of the terminal ID "01ca" of the starting communication terminal (i.e., the communication terminal 10), the terminal ID "01cb" of the start-instructing terminal (i.e., the mobile station 90a), and the terminal ID "01aa" of the counterpart communication terminal (i.e., the communication terminal 70a), which are included in the communication start request, the data processor 59 of the communication management system 50 changes the operating status field of each of records including the above-mentioned terminal ID "01ca", terminal ID "01cb", and the terminal ID "01aa" to all "communicating" in the terminal management table (see FIG. 10) (step S110). Note that although the starting communication terminal and the counterpart communication terminal have not yet started streaming communication for a lecture or the like, the communication status of these communication terminals becomes "communicating", and the icons that indicate the communication status of these communication terminals are changed to ones that indicate "communicating" in the contact list displayed on an external communication terminal such as the mobile station 90b.

Subsequently, the selection unit 53 of the communication management system 50 selects the nearest relay device based on the IP address of the starting communication terminal (i.e., the communication terminal 10) and the IP address of the counterpart communication terminal (i.e., the communication terminal 70a) (step S111). The IP addresses of terminals are managed in the terminal management table, and the device ID the IP addresses of relay devices for identifying the relay devices are stored in the memory 5000 in advance.

Subsequently, the data processor 59 adds the device ID of the relay device selected in the step S111 to the field of the device ID of a relay device of the record where the fields (items) of the starting communication terminal ID includes terminal ID of the starting communication terminal (i.e., the communication terminal 10), in the session management table (see FIG. 12) (step S112).

Next, the generator 54 generates communication ID (step S113). Then, the data processor 59 stores the communication ID "co01" generated in the step S113, the terminal ID "01ca" of the starting communication terminal (i.e., the communication terminal 10) received in the step S109, and the terminal ID "01cb" of the start-instructing terminal (i.e., the mobile station 90a), in the communication information management table (see FIG. 13), in association with each other (step S114).

Subsequently, the data transmitter and receiver 51 transmits the communication start request to the counterpart communication terminal (i.e., the communication terminal 70a) (step S115). The communication start request requests to start streaming communication. The communication start request includes the terminal ID of the starting communication terminal (i.e., the communication terminal 10), the terminal ID of the counterpart communication terminal (i.e., the communication terminal 70a), the communication ID, and the IP address of the relay device. Accordingly, the data transmitter and receiver 71a of the counterpart communication terminal (i.e., the communication terminal 70a) receives the communication start request. Note also that the IP address of the relay device is the IP address of the relay device selected in the step S111.

As described above, the starting communication terminal (i.e., the communication terminal 10) performs streaming communication with the counterpart communication terminal (i.e., the communication terminal 70a). On the other hand, the start-instructing terminal (i.e., the mobile station 90a) is satisfactory as long as the communication management system 50 keeps track of the participation of the start-instructing terminal (i.e., the mobile station 90a) in the conference or the like.

FIG. 18 is a sequence diagram illustrating the processes of starting streaming communication from a personal communication terminal through a shared communication terminal, according to the present embodiment.

Subsequently, as illustrated in FIG. 18, the acceptance unit 72a of the counterpart communication terminal (i.e., the communication terminal 70a) accepts a response from a user Z to start the streaming communication requested in the step S115 (step S121). Then, the data transmitter and receiver 71a transmits affirmative or negative response information to the communication management system 50 (step S122).

The affirmative or negative response information includes the terminal ID of the starting communication terminal (i.e., the communication terminal 10) and the terminal ID of the counterpart communication terminal (i.e., the communication terminal 70a). As a result, the data transmitter and receiver 51 of the communication management system 50 receives the response to the affirmative or negative response information. In the present embodiment, cases where the affirmative or negative response information indicates an affirmative response are described as follows.

Next, the data processor 59 of the communication management system 50 associates the terminal ID "01aa" of the communication terminal 70a that serves as a counterpart communication terminal with the terminal ID of the communication terminal 10 that serves as a starting communication terminal, based on the affirmative response, in the session management table (see FIG. 12) (step S123). Due to this configuration, the communication management system 50 can manage what pair of communication terminals perform streaming communication through what relay device in what communication session.

Next, as depicted in FIG. 13, the data processor 59 of the communication management system 50 associates the terminal ID "01ca" of the starting communication terminal (i.e., the communication terminal 10) and the terminal ID "01aa" of the counterpart communication terminal (i.e., the communication terminal 70a) with the same communication ID "co01" (step S124). Due to this configuration, the communication management system 50 can manage what pair of shared communication terminals are performing streaming communication with each other in what lecture or the like indicated by communication ID, and can manage a user with what personal communication terminal is participating.

Then, the data transmitter and receiver 51 transmits affirmative or negative response information to the starting communication terminal (i.e., the communication terminal 10) (step S125). In this case, the affirmative or negative response information includes the communication ID associated in the step S124 and the IP address of the relay device 30 selected in the step S111. As a result, the data transmitter and receiver 11 of the starting communication terminal (i.e., the communication terminal 10) receives the affirmative or negative response information.

Subsequently, the data transmitter and receiver 11 of the starting communication terminal (i.e., the communication terminal 10) sends an establishment request to the IP address of the relay device 30 received in the step S125 (step S126). The establishment request indicates a request to establish a streaming communication session, and the establishment request includes the terminal ID of the starting communication terminal (i.e., the communication terminal 10) and the terminal ID of the counterpart communication terminal (i.e., the communication terminal 70a). At the same time, the IP address of the starting communication terminal, which serves as a request sender, is also sent.

On the other hand, the data transmitter and receiver 71a of the counterpart communication terminal (i.e., the communication terminal 70a) sends an establishment request to the IP address of the relay device 30 received in the step S115 (step S127). The establishment request indicates a request to establish a streaming communication session, and the establishment request includes the terminal ID of the starting communication terminal (i.e., the communication terminal 10) and the terminal ID of the counterpart communication terminal (i.e., the communication terminal 70a). At the same time, the IP address of the counterpart communication terminal (i.e., the communication terminal 70a), which serves as a request sender, is also sent. Accordingly, a communication session in which the relay device 30 and the starting communication terminal perform streaming communication to exchange image data and audio data with each other is established (step S128-1), and a communication session in which the relay device 30 and the counterpart communication terminal perform streaming communication to exchange image data and audio data with each other is established (step S128-2).

Once a communication session is established as above, the shared communication terminal (i.e., the communication terminal 10) and the shared communication terminal (i.e., the communication terminal 70*a*) can start streaming communication where image data and audio data are exchanged.

Figure 20A:
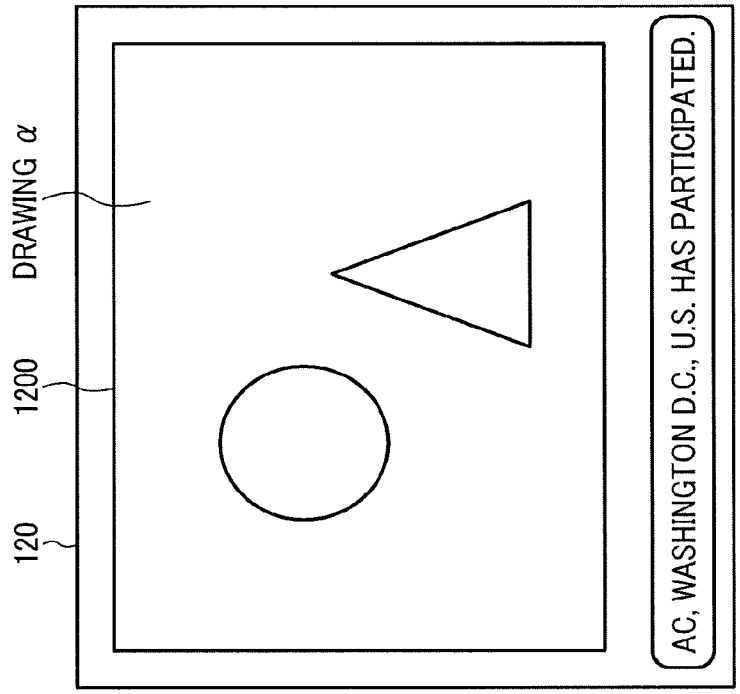
FIG. 20A illustrates an example screen where drawing is displayed, on a communication terminal 70a side, during streaming communication, according an embodiment of the present invention.

FIG. 20A illustrates an example screen where drawing is displayed, on the communication terminal 70*a* side, during the streaming communication, according the present embodiment.

Figure 20B:
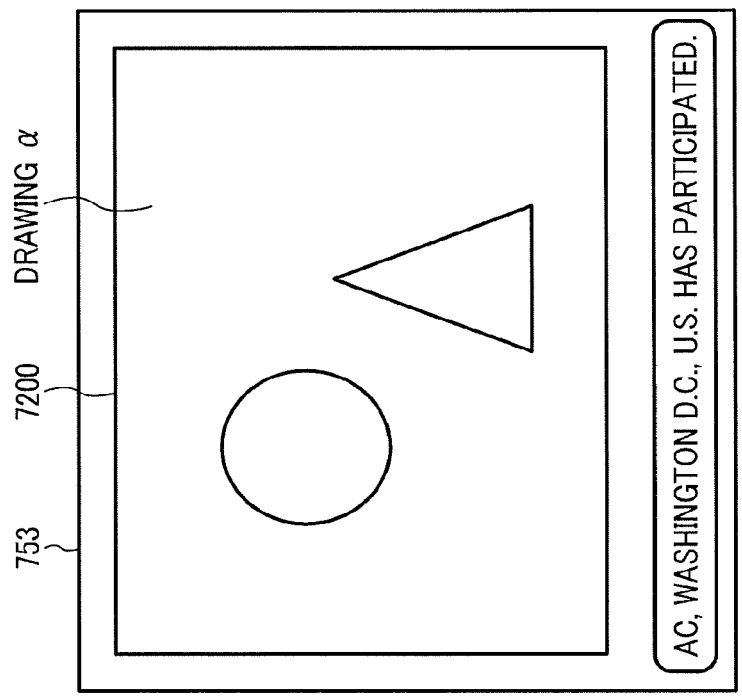
FIG. 20B illustrates an example screen where drawing is displayed, on a communication terminal 10 side, during streaming communication, according an embodiment of the present invention.

FIG. 20B illustrates an example screen where drawing is displayed, on the communication terminal 10 side, during the streaming communication, according the present embodiment.

Figure 21B:
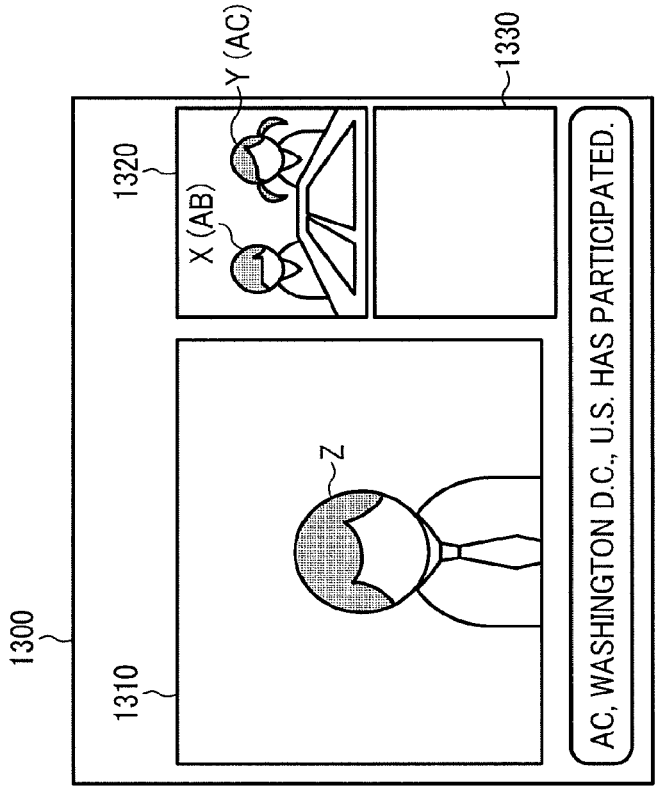
FIG. 21B illustrates an example screen where the views at two sites are displayed, on a communication terminal 10 side, during streaming communication, according an embodiment of the present invention.
Figure 21A:
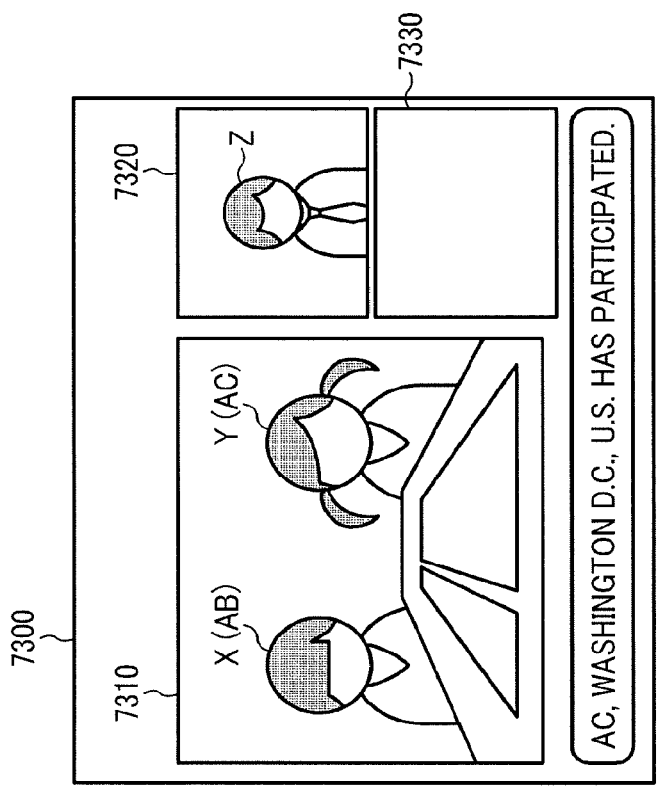
FIG. 21A illustrates an example screen where the views at two sites are displayed, on a communication terminal 70a side, during streaming communication, according an embodiment of the present invention.

FIG. 21A illustrates an example screen where the views at two sites are displayed, on the communication terminal 70*a* side, during the streaming communication, according the present embodiment.

FIG. 21B illustrates an example screen where the views at two sites are displayed, on the communication terminal 10 side, during the streaming communication, according the present embodiment.

More specifically, as illustrated in FIG. 20A, when drawing α is drawn on the display 753 by the electronic stylus 754, the hand H, or the like while the user Z at the site A is displaying a drawing screen 7200 on the display 753, the drawing data of the drawing α is transmitted from the data transmitter and receiver 71*a* of the shared communication terminal (i.e., the communication terminal 70*a*) to the data transmitter and receiver 11 of the shared communication terminal (i.e., the communication terminal 10) through the communication network 4. Then, the data processor 19 of the shared communication terminal (i.e., the communication terminal 10) at the site C overwrites and stores the drawing data of the drawing α in the memory 1000, and the display controller 14 display drawing α on a drawing screen 1200 displayed on the display 120, as illustrated in FIG. 20B.

It is also possible to switch the drawing screen 7200 and the drawing screen 1200 illustrated in FIG. 20A and FIG. 20B to a site view 7300 and a site view 1300 illustrated in FIG. 21A and FIG. 21B, respectively. More specifically, as illustrated in FIG. 21A, on the site view 7300 of the shared communication terminal (i.e., the communication terminal 70*a*) at the site A, the display controller 74*a* controls the display to display a display area 7310 and a display area 7320. The display area 7310 indicates an image on the other side (on the communication terminal 10 side) (i.e., the image of the figure of the user X in the present embodiment), and the display area 7320 indicates an image on the local communication terminal (i.e., the communication terminal 70*a*) side (i.e., the image of the figure of the user Z in the present embodiment). Moreover, the display controller 74*a* displays a display area 7330 within the site view 7300. When a third shared communication terminal jumps in the streaming communication, an image on such a third shared communication terminal side is displayed on the display area 7330.

On the other hand, as illustrated in FIG. 21B, within the site view 1300 of the shared communication terminal (i.e., the communication terminal 10) at the site C, the display controller 14 controls the display to display a display area 1310 and a display area 1320. The display area 1310 indicates an image on the other side (on the communication terminal 70*a* side) (i.e., the image of the figure of the user Z in the present embodiment), and the display area 1320 indicates an image on the local communication terminal (i.e., the communication terminal 10) side (i.e., the image of the figure of the user X in the present embodiment). Moreover, the display controller 14 displays a display area 1330 within the site view 1300. When a third shared communication terminal jumps in the streaming communication, an image on such a third shared communication terminal side is displayed on the display area 1330. When a personal communication terminal at the site C jumps in the streaming communication rather than a third shared communication terminal, the number of people displayed in the display area 1320 increases.

Next, with reference FIG. 19A to FIG. 21, the processes are described in which the user Y having a personal communication terminal (i.e., the mobile station 90*b*) at the site C newly jumps in (participates in) the streaming communication for a conference or the like.

Figure 19A:
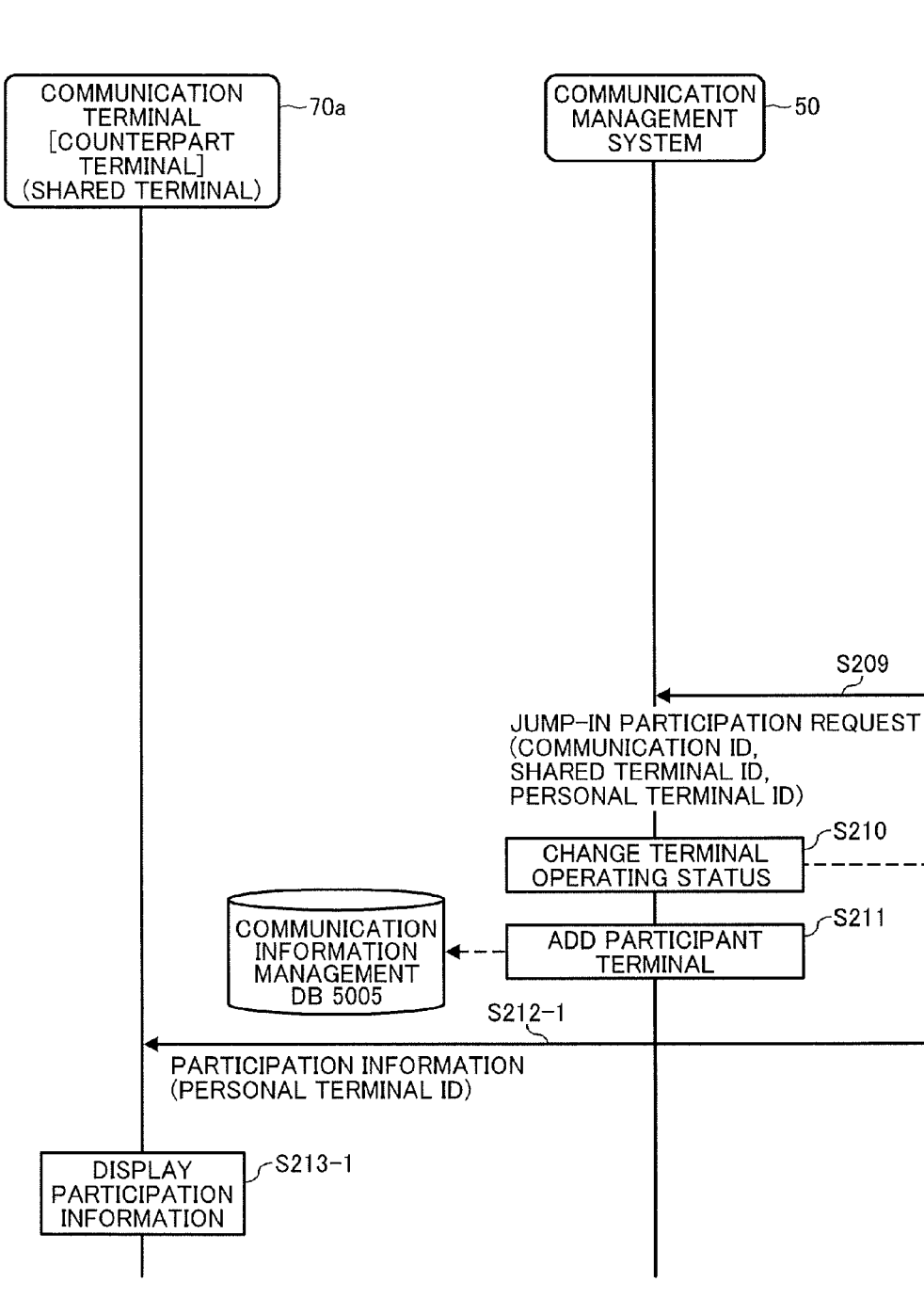
FIG. 19A and FIG. 19B are a sequence diagram illustrating the processes in which a personal communication terminal jumps in (participates in) streaming communication, according to an embodiment of the present invention.
Figure 19B:
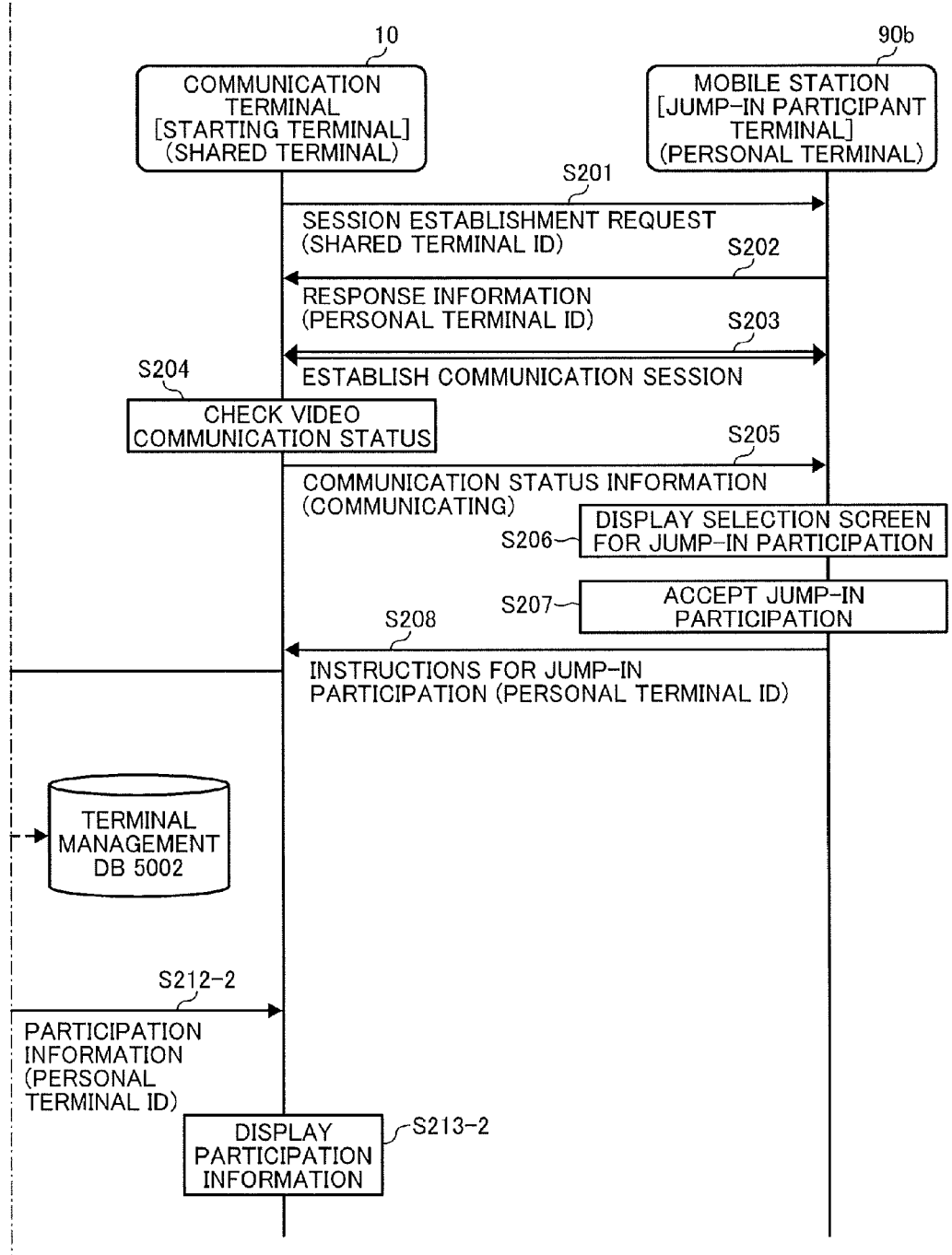

FIG. 19A and FIG. 19B are a sequence diagram illustrating the processes in which the personal communication terminal (i.e., the mobile station 90*b*) jumps in (participates in) the streaming communication, according to the present embodiment.

Hereinafter, the description is given under the assumption that a personal communication terminal (i.e., the mobile station 90*b* in the present embodiment) has already completed the processes in the steps S21 to S40. Note that the mobile station 90*b* may also be referred to as "jump-in participant terminal" in addition to "personal communication terminal".

As illustrated in FIG. 19A and FIG. 19B, the shared communication terminal (i.e., the communication terminal 10) and the personal communication terminal (i.e., the mobile station 90*b*) perform steps S201 to S203 similar to those of the steps S101 to S103 at the site C, and thus the description of the steps S201 to S203 is omitted. After the step S203, the determining unit 15 of the shared communication terminal (i.e., the communication terminal 10) checks the status of streaming communication (step S204). In the present embodiment, the determining unit 15 determines that the status is in "communicating" as the shared communication terminal (i.e., the communication terminal 10) has already started the streaming communication with a counterpart shared communication terminal (i.e., the communication terminal 70*a*). Then, the data transmitter and receiver 11 of the shared communication terminal (i.e., the communication terminal 10) transmits communication status information indicating the communication status determined by the determining unit 15 to the jump-in participant terminal (i.e., the mobile station 90*b*) (step S205). In the present embodiment, the communication status indicates "communicating". Accordingly, the data transmitter and receiver 91*b* of the jump-in participant terminal (i.e., the mobile station 90*b*) receives the communication status information.

Next, on the mobile station 90*b* side, the display controller 94*b* controls the display to display a selection screen 9400*b* for jump-in participation (additional participation) as illustrated in FIG. 17B (step S206). On the selection screen 9400*b* for jump-in participation, as illustrated in FIG. 17B, a message 9410*b* prompting jump-in participation such as "Jump in the video communication being performed through the shared communication terminal?" and "YES" and "NO"

keys are displayed. Note that a key 9900*b* is equivalent to the key 9900*a*. Hereinafter, cases in which the mobile station 90*b* jumps in are described.

Once the user Y touches the "YES" key, the acceptance unit 92*b* of the mobile station 90*b* accepts jump-in participation (additional participation) (step S207).

Subsequently, the data transmitter and receiver 91*b* uses short-range radio communication to transmit instructions for jump-in participation to the shared communication terminal (i.e., the communication terminal 10) (step S208). The instructions for jump-in participation instruct the shared communication terminal (i.e., the communication terminal 10) to request to let the personal communication terminal (start-instructing terminal) (i.e., the mobile station 90*a*) jump in the streaming communication that has already been established by the shared communication terminal (i.e., the communication terminal 10). Such instructions for jump-in participation include the terminal ID of the personal communication terminal (i.e., the mobile station 90*b*). Accordingly, the shared communication terminal (i.e., the communication terminal 10) receives the instructions for jump-in participation.

Next, the data transmitter and receiver 11 of the shared communication terminal (i.e., the communication terminal 10), which serves as a starting communication terminal, transmits a jump-in participation request to the communication management system 50 (step S209). The jump-in participation request requests to let the personal communication terminal (start-instructing terminal) (i.e., the mobile station 90*a*) jump in the streaming communication that has already been established by the shared communication terminal (i.e., the communication terminal 10). The jump-in participation request includes the communication ID indicating a lecture or the like to participate in, the terminal ID of the shared communication terminal (i.e., the communication terminal 10) to which the instructions for jump-in participation have been sent, and the terminal ID of the jump-in participant terminal (i.e., the mobile station 90*b*) that requests jump-in participation. As a result, the data transmitter and receiver 51 of the communication management system 50 receives the jump-in participation request. Note also that the communication ID is received in the step S125 as described above.

Subsequently, on the basis of the terminal ID "01cc" of the jump-in participant terminal (i.e., the mobile station 90*b*) included in the jump-in participation request, the data processor 59 of the communication management system 50 changes the operating status field of each of records including the above-mentioned terminal ID "01cc" to "online (communicating)" in the terminal management table (see FIG. 10) (step S210).

Then, the data processor 59 associates the terminal ID "01cc" of the jump-in participant terminal (i.e., the mobile station 90*b*), which is received in the step S209, with the communication ID "co01" and the terminal ID "01ca" of the shared communication terminal (i.e., the communication terminal 10), each of which is received in the step S209, in the communication information management table (see FIG. 13) (step S211). Accordingly, as illustrated in FIG. 13, not only the terminal ID "01cb" of the personal communication terminal (i.e., the mobile station 90*a*) that participates in the streaming communication from the beginning but also the terminal ID "01cc" of the personal communication terminal (i.e., mobile station 90*b*) that has jumped in the streaming communication afterward are associated with the terminal ID "01ca" of the shared communication terminal. When a personal communication terminal is used on the site A side, in a similar manner to the above, the terminal ID of that personal communication terminal is associated with the terminal ID "01aa" of the shared communication terminal (i.e., the communication terminal 70*a*) in the communication information management table (see FIG. 13).

Subsequently, the data transmitter and receiver 51 transmits a participation notification to the shared communication terminal (i.e., the communication terminal 70*a*) on one side (step S212-1), and transmits the participation notification to the shared communication terminal (i.e., the communication terminal 10) on the other side (step S212-2). The participation notification indicates that a communication terminal has jumped in the video communication. Note also that the participation notification includes the terminal ID "01cc" of the jump-in participant terminal (i.e., the mobile station 90*b*) that has jumped in the streaming communication. Accordingly, the data transmitter and receiver 71*a* of the shared communication terminal (i.e., the communication terminal 70*a*) and the data transmitter and receiver 11 of the shared communication terminal (i.e., the communication terminal 10) receives the participation notification. As the communication terminals on the site C side are aware of the jump-in participant, the data transmitter and receiver 51 may transmit the participation notification only to the site A.

In the shared communication terminal (i.e., the communication terminal 70*a*), as illustrated in FIG. 20A, the display controller 74*a* controls the display 753 to display a message thereon indicating that a communication terminal has jumped in the streaming communication under the drawing screen 7200 (step S213-1). On the other hand, in the shared communication terminal (i.e., the communication terminal 10), as illustrated in FIG. 20B, the display controller 14 controls the display 120 to display a message thereon indicating that a communication terminal has jumped in the streaming communication under the drawing screen 1200 (step S213-2). Further, the display controller 74*a* controls the display to display a participation message on the site view 7300 based on the terminal ID of the jump-in participant terminal (i.e., the mobile station 90*b* in the present embodiment) received in the step S212-1 as above and the terminal ID and the contact name in the contact list information received in the step S31 as above. For example, the participation message "CC, WASHINGTON D. C. OFFICE, U.S. has participated" is displayed on the site view 7300.

On the other hand, the display controller 14 controls the display to display a participation message on the site view 1300 based on the terminal ID of the personal communication terminal (i.e., the mobile station 90*b* in the present embodiment) received in the step S212-2 as above and the terminal ID and the contact name in the contact list information received in the step S31 as above. For example, the participation message "CC, WASHINGTON D. C. OFFICE, U.S. has participated" is displayed on the site view 1300.

It is also possible to switch the drawing screen 7200 and the drawing screen 1200 illustrated in FIG. 20A and FIG. 20B to the site view 7300 and the site view 1300 illustrated in FIG. 21A and FIG. 21B, respectively. On the site view 7300 and the site view 1300, for example, the figures of the users at a different site are displayed. However, when the figures of the users are displayed as above, the user Z at the site A can visually recognize who is participating at the site C but cannot view the drawing as illustrated in FIG. 21A. By contrast, when the drawing is displayed but the figures of the users at the site C are not displayed as illustrated in FIG. 20A, it is difficult for the user Z at the site A to visually recognize who is participating at the site C. As a result, for example, when the user Z would like to provide the participant with the drawing data after the lecture, it could be impossible for the user Z to identify who the participant is. In particular, when there are a large number of participants, it becomes very difficult for the user Z to identify the destination device to which the drawing data is to be distributed. Alternatively, there are some cases where the user Z would like to distinguish participants to be provided with the drawing data from the other participants not to be provided with the drawing data. In order to deal with such a situation, the processes as illustrated in FIG. 22 and FIG. 24 are performed in the present embodiment.

FIG. 22 is a sequence diagram illustrating the operation of distributing the drawing data, according to present embodiment.

Figure 24:
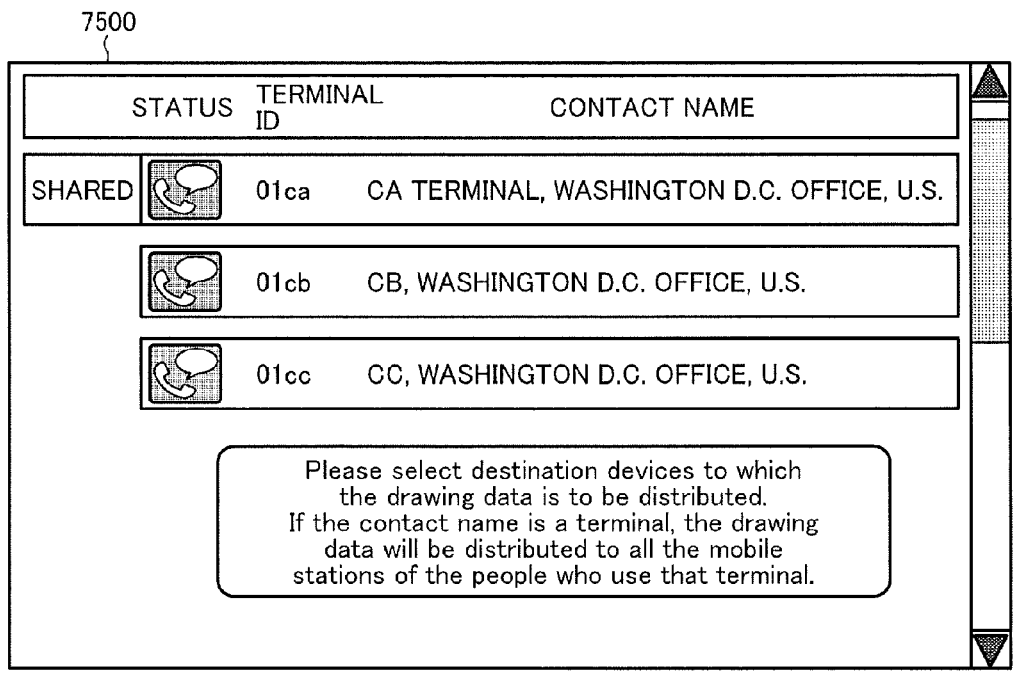
FIG. 24 illustrates an example screen to select a destination device to which drawing data is to be distributed, according to an embodiment of the present invention.

FIG. 24 illustrates an example screen to select a destination device to which the drawing data is to be distributed, according to the present embodiment.

As illustrated in FIG. 22, firstly, the acceptance unit 72a of the shared communication terminal (i.e., the communication terminal 70a) at the site A accepts requests for the terminal ID of all the participant communication terminals from the user Z (step S301). Subsequently, the data transmitter and receiver 71a of the shared communication terminal (i.e., the communication terminal 70a) transmits a request for the terminal ID of all the participant communication terminals of the participants who have participated in the same conference or the like to the communication management system 50 (step S302). Such a request includes the communication ID that identifies the so far held conferences or the like. As a result, the data transmitter and receiver 51 of the communication management system 50 receives the request.

Next, the data processor 59 of the communication management system 50 searches the communication information management table (see FIG. 13) using the communication ID received in the step S302 as a search key to read the requested terminal ID of the shared communication terminal and the personal communication terminal (step S303). Then, the data transmitter and receiver 51 of the communication management system 50 transmits all the terminal ID read in the step S303 to the shared communication terminal (i.e., the communication terminal 70a) (step S304). In so doing, the association information of each terminal ID, e.g., as illustrated in FIG. 13, the information that the terminal ID of the personal communication terminals corresponding to the shared communication terminal ID "01ca" includes "01cb" and "01cc", and the information that the shared communication terminal ID "01ca" and "01aa" are managed by the same communication ID "co01", is transmitted. As a result, the data transmitter and receiver 71a of the shared communication terminal (i.e., the communication terminal 70a) receives all the terminal ID.

Subsequently, the display controller 74a of the shared communication terminal (i.e., the communication terminal 70a) controls the display to display a destination-device selection screen for selecting a destination device to which the drawing data is to be distributed, according to the terminal ID received in the step S304, as illustrated in FIG. 24 (step S305). In this configuration, the shared communication terminal (i.e., the communication terminal 70a) has already received the contact list information when the shared communication terminal logged in. Accordingly, as illustrated in FIG. 24, the display controller 74a controls the display to display only the destination devices with the terminal ID received in the step S304 among the terminal ID in contact list information. As illustrated in FIG. 24, a destination-device selection screen 7500 appears similar to the contact list illustrated in FIG. 15C. However, a tab indicating "shared" is additionally displayed for the destination device that is a shared communication terminal. Accordingly, the user Z can easily figure out what destination address is a shared communication terminal and what destination address is a personal communication terminal.

Subsequently, the acceptance unit 72a accepts the selection of a destination device from the user Z (step S306). In the present embodiment, cases where the user Z distributes the drawing data only to the mobile station 90a with the terminal ID "01cb" and does not distribute the drawing data to the mobile station 90b are described.

The data transmitter and receiver 71a of the communication terminal 70a transmits the terminal ID of the destination address selected in the step S306 to the communication management system 50 (step S307). As a result, the data transmitter and receiver 51 of the communication management system 50 receives the terminal ID of the destination addresses. Subsequently, the specification unit 55 of the communication management system 50 refers to the communication information management table (see FIG. 13) to specify the target communication terminal based on the terminal ID received in the step S307 (S308). Here, the step S308 of specifying the destination devices is described in detail with reference to FIG. 23.

Figure 23:
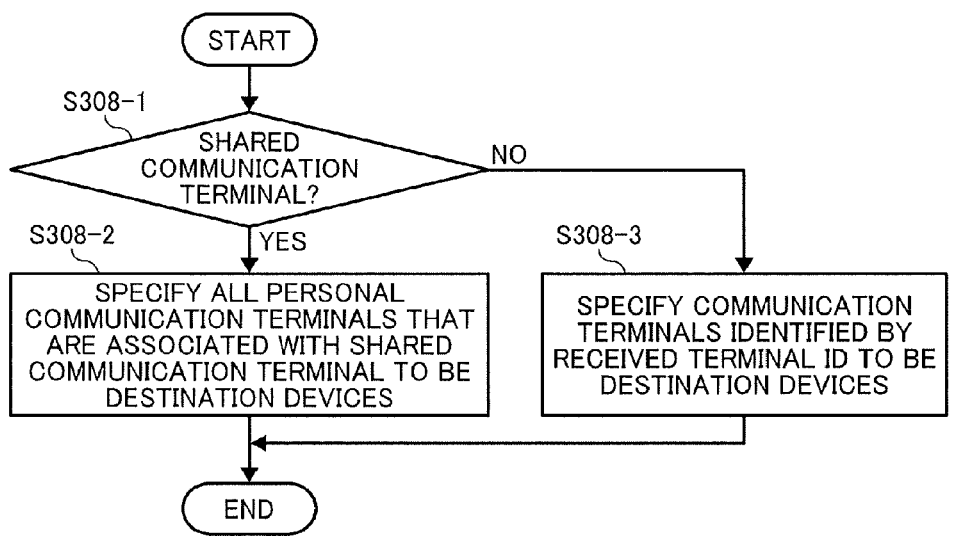
FIG. 23 is a sequence diagram illustrating the operation of specifying a destination device, according to an embodiment of the present invention.

FIG. 23 is a sequence diagram illustrating the operation of specifying a destination device, according to the present embodiment.

Firstly, the determining unit 52 determines whether the terminal ID of the destination device selected in the step S306 (i.e., the terminal ID received in the step S307 in the present embodiment) is stored as the terminal ID of shared communication terminal in the communication information management table (see FIG. 13) (step S308-1). Then, when the determining unit 52 determines that the terminal ID is stored as the terminal ID of shared communication terminal ("YES" in step S308-1), the specification unit 55 specifies the all communication terminals identified by the terminal ID stored as the terminal ID of the personal communication terminals that correspond to (are associated with) the terminal ID of the shared communication terminal, to be the destination devices (step S308-2). On the other hand, when the determining unit 52 determines that the terminal ID is not stored as the terminal ID of shared communication terminal ("NO" in step S308-1), the specification unit 55 specifies the communication terminals identified by the terminal ID selected in the step S306 (i.e., the terminal ID received in the step S307 in the present embodiment) to be the destination devices (step S308-3).

Next, return to FIG. 22. The data transmitter and receiver 51 of the communication management system 50 transmits a provision request to the communication terminal 10 (step S309). The provision request requests to provide the drawing data to the destination devices specified by the specification unit 55. When the destination devices are specified in the processes of step S308-2 as described above, the provision request includes the terminal ID of all the specified personal communication terminals. On the other hand, when the destination devices are specified in the processes of step S308-3 as described above, the provision request includes all the terminal ID sent in the step S307. Accordingly, the data transmitter and receiver 11 of the communication terminal 10 receives the provision request.

Subsequently, the data processor 19 of the communication terminal 10 reads the drawing data, which is requested to provide, from the memory 1000 (step S310). Then, the data converter 16 converts the read drawing data into Portable Document Format (PDF) data (step S311).

Next, the data transmitter and receiver 11 transmits the PDF data to the communication terminals identified by the terminal ID sent in the step S309 (step S312).

FIG. 22 illustrates cases in which the shared communication terminal (i.e., the communication terminal 10) sends the PDF data to the personal communication terminal (i.e., the mobile station 90a).

Due to this configuration, even if the mobile station 90a does not have a function (software) to display the drawing data, the mobile station 90a can display the PDF data, which is the widespread file format.

As described above, according to the present embodiment, when the shared communication terminal (i.e., the communication terminal 10) is to start streaming communication in response to the request sent from the personal communication terminal (i.e., the mobile station 90a), the shared communication terminal (i.e., the communication terminal 10) obtains the terminal ID of the personal communication terminal (i.e., the mobile station 90a) from the personal communication terminal (i.e., the mobile station 90a) (S108). Then, the shared communication terminal (i.e., the communication terminal 10) sends the terminal ID of the local communication terminal (i.e., the communication terminal 10) and the personal communication terminal (i.e., the mobile station 90a) to the communication management system 50 (S109). Then, the communication management system 50 associates the shared communication terminal (i.e., the communication terminal 10) used in streaming communication for a conference or the like with the personal communication terminal (i.e., the mobile station 90a) owned by the user who participates in the streaming communication, in the communication information management table (see FIG. 13) (S114). Due to this configuration, the user Z who wishes to send the drawing data to participants during or after a conference or the like can easily specify the destination devices to which the drawing data is to be sent.

As described above, according to the present embodiment, when the shared communication terminal (i.e., the communication terminal 10) is to let the personal communication terminal (i.e., the mobile station 90b) jump in the streaming communication in response to the request sent from the personal communication terminal (i.e., the mobile station 90b), the shared communication terminal (i.e., the communication terminal 10) obtains the terminal ID of the personal communication terminal (i.e., the mobile station 90b) from the personal communication terminal (i.e., the mobile station 90b) (S208). Then, the shared communication terminal (i.e., the communication terminal 10) sends the terminal ID of the local communication terminal (i.e., the communication terminal 10) and the personal communication terminal (i.e., the mobile station 90b) to the communication management system 50 (S209). Then, the communication management system 50 associates the shared communication terminal (i.e., the communication terminal 10) used in streaming communication for a conference or the like with the personal communication terminal (i.e., the mobile station 90a) owned by the user who participates in the streaming communication, in the communication information management table (sec FIG. 13) (S211). Due to this configuration, the user Z who wishes to send the drawing data to participants during or after a conference or the like can easily specify the destination devices to which the drawing data is to be sent.

Further, when the user Z would like to provide the drawing data to a desired user, the shared communication terminal (i.e., the communication terminal 70a) obtains from the communication management system 50 the terminal ID of all the mobile stations and the shared communication terminals that participate in the streaming communication (S304). Then, the shared communication terminal (i.e., the communication terminal 70a) requests the communication management system 50 to provide the desired personal communication terminal selected by the user Z with the drawing data (S308). Further, the communication management system 50 sends the terminal ID of the desired personal communication terminal when the communication management system 50 requests the shared communication terminal (i.e., the communication terminal 10) to provide the drawing data (S309). Accordingly, the shared communication terminal (i.e., the communication terminal 10) can provide the desired personal communication terminal with the drawing data (S312). As a result, the user Z can finally distribute the drawing data to the desired user who participates in a conference or a lecture.

While the personal communication terminals (i.e., the mobile stations 90a and 90b) can start the communication with a counterpart communication terminal on their own, the personal communication terminal can also serve as a handy remote control for the shared communication terminal (i.e., the communication terminal 70a).

Modification

Figure 25:
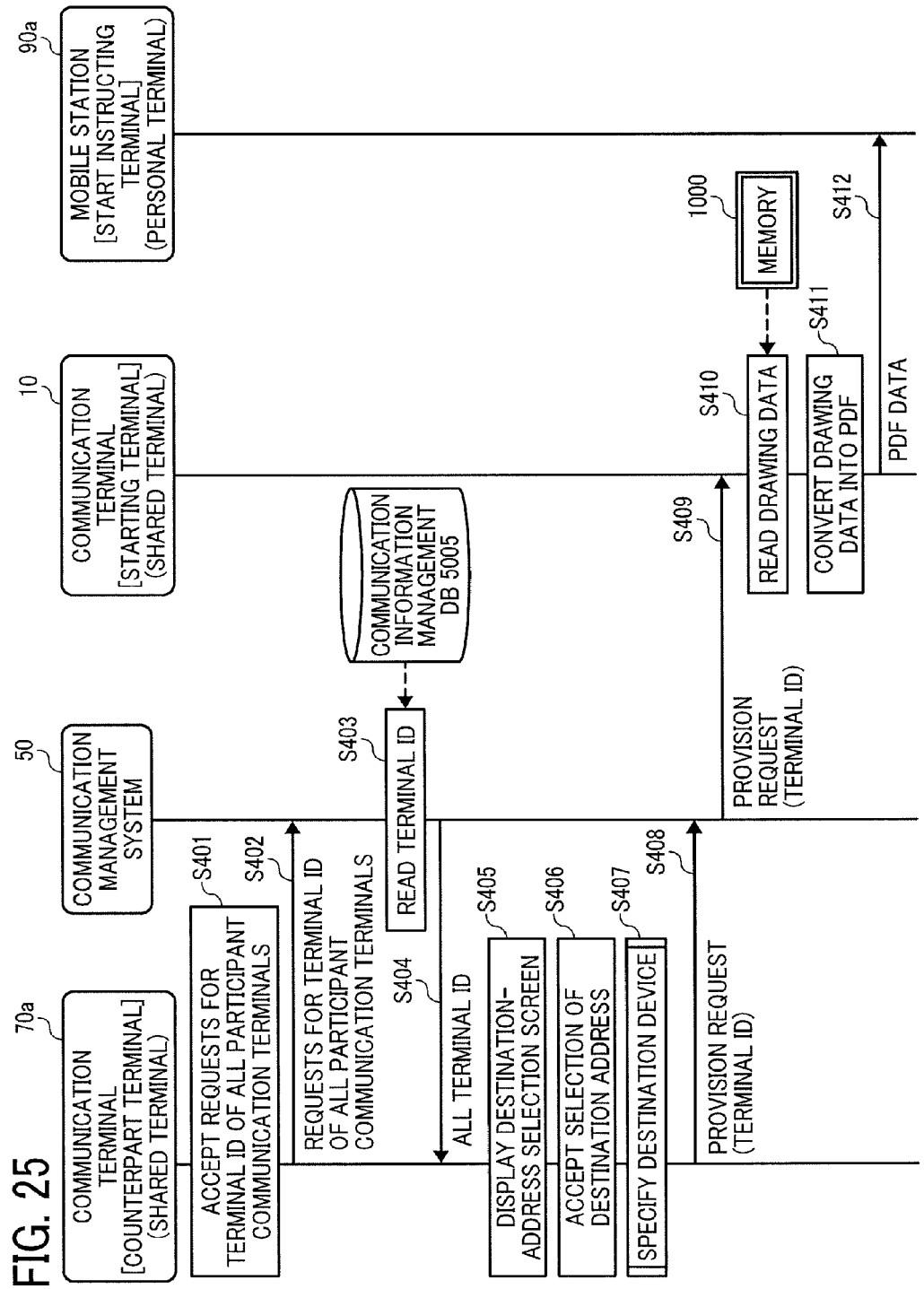
FIG. 25 is a sequence diagram illustrating the operation of distributing drawing data, according to a modification of the embodiment illustrated in FIG. 22.

FIG. 25 is a sequence diagram illustrating the operation of distributing the drawing data, according to a modification of the above embodiment. As illustrated in FIG. 22, the communication management system 50 specifies the destination devices in the step S308. By contrast, in the present modification, the shared communication terminal (i.e., the communication terminal 70a) specifies the destination devices, as illustrated in FIG. 25.

More specifically, the processes of the steps S401 to S406 in FIG. 25 are equivalent to the processes of the steps S301 to S306 in FIG. 22. Thus, the description of the processes of the steps S401 to S406 in FIG. 25 are omitted. In the processes of the step S406, when the acceptance unit 72a receives the selection of the shared communication terminal (i.e., the shared communication terminal with the terminal ID "01ca" in the present modification) on the destination-device selection screen 7500 illustrated in FIG. 24, as illustrated in FIG. 27A and FIG. 27B, the display controller 74a visually displays a message indicating that all the personal communication terminals associated with the shared communication terminal are selected. In FIG. 27A, the color of the areas where the destination devices are displayed is changed. Accordingly, the user Z can visually figure out that the reference-material data is distributed to each personal communication terminal (for example, the mobile station 90a).

After the processes of the step S406, the determining unit 75a of the shared communication terminal (i.e., the communication terminal 70a) serves as a specification unit, and specifies the target communication terminal based on all the terminal ID received in the step S406 (step S407). Here, the step S407 of specifying the destination devices is described in detail with reference to FIG. 26.

Figure 26:
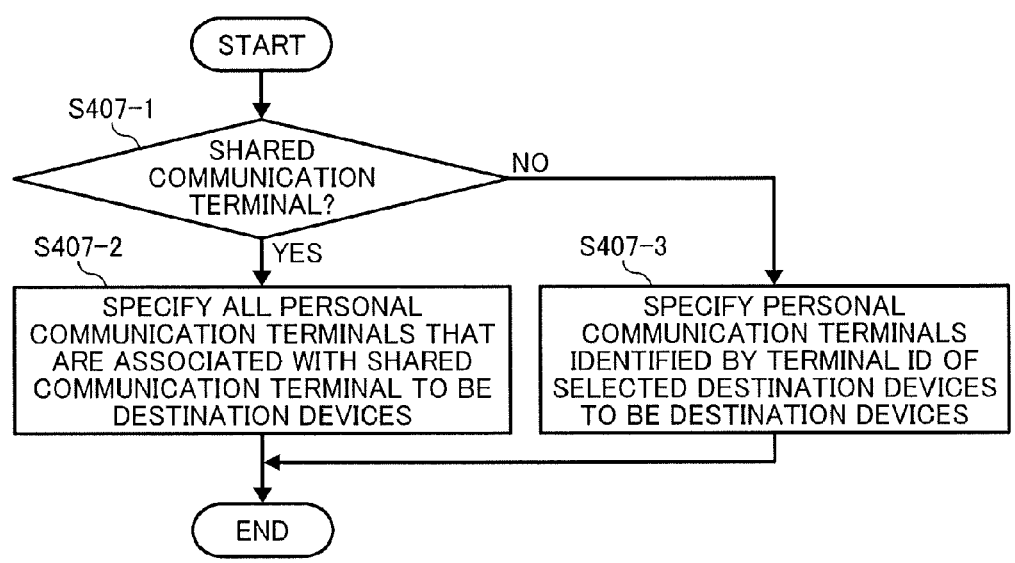
FIG. 26 is a sequence diagram illustrating the operation of specifying a destination device, according to a modification of the embodiment illustrated in FIG. 23.

FIG. 26 is a sequence diagram illustrating the operation of specifying a destination device, according to the present modification.

Firstly, the determining unit 75a determines whether the terminal ID of the destination devices selected in the step S406 is stored as the terminal ID of shared communication terminal with reference to all the terminal ID received in the step S404 (step S407-1). Then, when the determining unit 75a determines that the terminal ID is stored as the terminal ID of shared communication terminal ("YES" in step S407-1), the determining unit 75a serves as a specification unit and specifies the all communication terminals identified by the terminal ID stored as the terminal ID of the personal communication terminals that correspond to (are associated with) the terminal ID of the shared communication terminal, to be the destination devices (step S407-2). On the other hand, when the determining unit 75a determines that the terminal ID is not stored as the terminal ID of shared communication terminal ("NO" in step S407-1), the determining unit 75a specifies the communication terminals identified by the terminal ID of the destination addresses selected in the step S406 to be the destination devices (step S407-3).

Next, return to FIG. 25. The data transmitter and receiver 71a of the shared communication terminal (i.e., the communication terminal 70a) transmits a provision request to the communication management system 50 (step S408). The provision request requests to provide the drawing data to the destination devices specified in the processes of the step S407. Moreover, the provision request includes the terminal ID of the destination devices specified in the step S407. Accordingly, the data transmitter and receiver 51 of the communication management system 50 receives the provision request, and transfers the received provision request to the shared communication terminal (i.e., the communication terminal 10) on the site C side (step S409). The subsequent processes of the steps S410 to S412 in FIG. 25 are equivalent to the processes of the steps S310 to S312 in FIG. 22. Thus, the description of the processes of the steps S410 to S412 in FIG. 25 is omitted.

FIG. 27A and FIG. 27B illustrate example screens to select destination devices to which the drawing data is to be distributed, according to a modification of the embodiment illustrated in FIG. 24. As described above, in the processes of the steps S405 and S406, the display controller 74a controls the display to display the destination-device selection screen 7500 as illustrated in FIG. 24. However, no limitation is intended therein. For example, when the shared communication terminal with the terminal ID "01ca" is selected in the step S406, the display controller 74a may control the display to display a destination-device selection screen 7510 as illustrated in FIG. 27A. On the destination-device selection screen 7510, not only the color of the areas where the destination devices of the shared communication terminal with the terminal ID of "01ca" are displayed is changed, but also the color of the areas where the destination devices of the personal communication terminals with the terminal ID of "01cb" and "01cc", which are associated with the communication terminal with the terminal ID of "01ca", is changed. Accordingly, the user Z can easily and visually figure out the destination devices.

Alternatively, the display controller 74a may control the display to display a destination-device selection screen 7520 as illustrated in FIG. 27B. On the destination-device selection screen 7520, checkboxes are displayed to select the destination devices. When the checkbox of the destination devices of the shared communication terminal with the terminal ID of "01ca" is checked, the checkboxes of the destination devices of the personal communication terminals with the terminal ID of "01cb" and "01cc", which are associated with the communication terminal with the terminal ID of "01ca", are automatically checked.

In FIG. 22, the processes of the steps S301, S302, and S304 to S307 are performed on the shared communication terminal (i.e., the communication terminal 70a) side, and the processes of the steps S309 to S312 are performed on the shared communication terminal (i.e., the communication terminal 10) side. However, these two sets of processes may be performed the other way around. More specifically, the shared communication terminal (i.e., the communication terminal 10) is capable of performing the processes of the steps S301, S302, and S304 to S307, and the shared communication terminal (i.e., the communication terminal 70a) is capable of performing the processes of the steps S309 to S312. The same can be said of the processes in FIG. 25.

In the above-described embodiments, terminal ID of communication terminals is exchanged among personal communication terminals and shared communication terminals by short-range radio communication. However, no limitation is indicated thereby and the terminal ID may be exchanged by cable communications using, for example, a USB cable. Alternatively, the terminal ID may be exchanged using a QR code that indicates the terminal ID of a communication terminal. Such a QR code indicating the terminal ID of a communication terminal on one side is displayed on the display of a communication terminal on the other side, and the displayed QR code is read on the other side to obtain the terminal ID of the communication terminal.

Cases where a video conference terminal or an electronic whiteboard is used as a communication terminal, which is an example of office equipment, have been described. However, no limitation is intended therein. The communication terminal may be, for example, an Internet protocol (IP) phone, an Internet phone, a car navigation terminal, or a surveillance camera. In alternative to the video conference terminal and the electronic whiteboard, any other type of office equipment may be used such as a printer, facsimile, and multifunction peripheral (MFP). Further, the communication terminal may be implemented as medical equipment, such as an electronic endoscope, a Computed Tomography (CT) scan, and radiotherapy equipment.

Further, in alternative to the smartphone, any other mobile station may be used, such as a mobile phone, digital camera, portable game machine, IC card, or wearable computer. A wearable computer includes, for example, a smart watch and a head-mounted display.

In addition, although image data and audio data are described as examples of contents of data in the above-described embodiment, the contents of data are not limited to these items of data, and the contents of data may be touch data. In this ease, the sensation obtained by a user's contact at one terminal side is transmitted to the other terminal side. Further, the contents of data may be smell data. In this case, a smell at one terminal side is transmitted to the other terminal side. Based on the received data of smell, a smell generator, which may be incorporated in or connected to the other terminal, may generate a smell based on such received data. The contents of data may be at least one of image data, audio data, touch data, and smell data.

Although the case in which a video conference is held by the communication system 1 has been described in the above-described embodiment, the embodiment is not limited to this case. The communication system 1 may be used in meetings, general conversation, for example, among friends or family members, or one-way presentation of information.

In the above-described embodiments, a request for storing processes or a request for reading processes are transmitted or received by short-range radio communication such as near-field communication (NFC). However, such requests may be transmitted or received by ultrasonic communication.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A shared communication terminal to be shared by a plurality of users, the shared communication terminal comprising:
   a transmitter and receiver to
      receive, from a first personal communication terminal personalized to a first user of the plurality of users who participates in a streaming communication at a first site, first personal communication terminal identification information for identifying the first personal communication terminal, and
      receive an instruction to start communication instructing the shared communication terminal, which serves as a local communication terminal at the first site, to request to start streaming communication with a counterpart shared communication terminal at a second site to exchange contents of data; and
   a transmitter to
      transmit the first personal communication terminal identification information to a communication management system and
      transmit communication start request indicating a request that the local communication terminal requests to start streaming communication with the counterpart shared communication terminal,
   wherein
   the transmitter and receiver
      receives, from a second personal communication terminal personalized to a second user of the plurality of users who participates in the streaming communication at the first site, second personal communication terminal identification information for identifying the second personal communication terminal, and
      receives an instruction for jump-in participation instructing the local communication terminal to request to let the second personal communication terminal jump in the streaming communication, and
   the transmitter
      transmits the second personal communication terminal identification information to the communication management system, and
      transmits jump-in participation request indicating a request to let the second personal communication terminal jump in the streaming communication.

2. The shared communication terminal according to claim 1, further comprising:
   circuitry to determine whether the local communication terminal is able to perform streaming communication with the counterpart shared communication terminal or whether the counterpart shared communication terminal is already performing streaming communication with the counterpart shared communication terminal,
   wherein
   when the circuitry determines that the local communication terminal is able to perform streaming communication with the counterpart shared communication terminal,
   the transmitter and receiver
      transmits, to the first personal communication terminal, communication status information indicating that the local communication terminal is able to perform streaming communication with the counterpart shared communication terminal, and
      receives the first personal communication terminal identification information and the instruction to start communication sent from the first personal communication terminal in response to transmission of the communication status information.

3. The shared communication terminal according to claim 1, further comprising:
   circuitry to determine whether the local communication terminal is able to perform streaming communication with the counterpart shared communication terminal or whether the counterpart shared communication terminal is already performing streaming communication with the counterpart shared communication terminal,
   wherein
   when the circuitry determines that the local communication terminal is already performing streaming communication with the counterpart shared communication terminal,
   the transmitter and receiver
      transmits, to the second personal communication terminal, communication status information indicating that the local communication terminal is already performing streaming communication with the counterpart shared communication terminal, and
      receives the second personal communication terminal identification information and the instruction for jump-in participation sent from the second personal communication terminal in response to transmission of the communication status information.

4. The shared communication terminal according to claim 1, further comprising:
   a receiver to receive from the communication management system a participation notification indicating that the second personal communication terminal has jumped in the streaming communication in response to the jump-in participation request sent from the transmitter to the communication management system; and
   circuitry to control a display to display a participation message indicating that the second personal communication terminal has participated in the streaming communication, in response to reception of the participation notification.

5. The shared communication terminal according to claim 4, wherein
   the receiver receives, from the communication management system, terminal identification information for identifying a candidate counterpart of the local communication terminal and contact list information where the terminal identification information is associated with a contact name of the candidate counterpart,
   the receiver receives from the communication management system the participation notification including terminal identification information of the second personal communication terminal that has jumped in the streaming communication, and
   the circuitry controls the display to display the participation message including the contact name associated in the contact list information, based on the terminal identification information included in the received participation notification.

6. The shared communication terminal according to claim 4, wherein
the participation notification includes a participation message including a contact name of the second personal communication terminal that has jumped in the streaming communication, and
the circuitry controls the display to display the received participation message.

7. The shared communication terminal according to claim 4, wherein
the receiver receives from the counterpart shared communication terminal a provision request indicating a request to distribute reference-material data to a specific personal communication terminal as a specific destination device, through the communication management system, and
the transmitter and receiver transmits the reference-material data to the specific personal communication terminal according to the received provision request.

8. The shared communication terminal according to claim 7, further comprising:
circuitry to convert the reference-material data into data of a prescribed file format when the reference-material data is drawing data,
wherein
the transmitter and receiver transmits the converted reference-material data to the specific personal communication terminal.

9. The shared communication terminal according to claim 8, wherein
the prescribed file format includes one of plain text, RTF, BMP, GIF, JPEG, TIFF, MPEG, AVI, MP3, WMA, and ACC.

10. The shared communication terminal according to claim 1, wherein
the shared communication terminal is a video conference terminal or an electronic whiteboard.

11. A communication system comprising:
a second shared communication terminal at a second site; and
a first shared communication terminal to be shared by a plurality of users, the first shared communication terminal comprising
a transmitter and receiver to
receive, from a first personal communication terminal personalized to a first user of the plurality of users who participates in a streaming communication at a first site, first personal communication terminal identification information for identifying the first personal communication terminal, and
receive an instruction to start communication instructing the first shared communication terminal, which serves as a local communication terminal at the first site, to request to start streaming communication with the second shared communication terminal at the second site to exchange contents of data, and
a transmitter to
transmit the first personal communication terminal identification information to a communication management system and
transmit communication start request indicating a request that the local communication terminal requests to start streaming communication with the second shared communication terminal,
wherein
the transmitter and receiver
receives, from a second personal communication terminal personalized to a second user of the plurality of users who participates in the streaming communication at the first site, second personal communication terminal identification information for identifying the second personal communication terminal, and
receives an instruction for jump-in participation instructing the local communication terminal to request to let the second personal communication terminal jump in the streaming communication, and
the transmitter
transmits the second personal communication terminal identification information to the communication management system, and
transmits jump-in participation request indicating a request to let the second personal communication terminal jump in the streaming communication.

12. A method of communication, the method comprising:
receiving, from a first personal communication terminal personalized to a user who participates in a streaming communication at a first site, first personal communication terminal identification information for identifying the first personal communication terminal;
receiving an instruction to start communication instructing a shared communication terminal, which serves as a local communication terminal at the first site, to request to start streaming communication with a counterpart shared communication terminal at a second site to exchange contents of data;
transmitting the first personal communication terminal identification information to a communication management system; and
transmitting communication start request indicating a request that the local communication terminal requests to start streaming communication with the counterpart shared communication terminal,
wherein the method further includes
receiving, from a second personal communication terminal personalized to a second user of a plurality of users who participates in the streaming communication at the first site, second personal communication terminal identification information for identifying the second personal communication terminal,
receiving an instruction for jump-in participation instructing the local communication terminal to request to let the second personal communication terminal jump in the streaming communication,
transmitting the second personal communication terminal identification information to the communication management system, and
transmitting jump-in participation request indicating a request to let the second personal communication terminal jump in the streaming communication.

* * * * *